US012807068B2

(12) United States Patent
LaCross

(10) Patent No.: US 12,807,068 B2
(45) Date of Patent: Nov. 24, 2026

(54) VEHICULAR ACTUATOR WITH VARIABLE FORCE PROFILE

(71) Applicant: Magna Mirrors of America, Inc., Holland, MI (US)

(72) Inventor: Anthony J. LaCross, Hastings, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 402 days.

(21) Appl. No.: 18/416,029

(22) Filed: Jan. 18, 2024

(65) Prior Publication Data

US 2024/0246485 A1 Jul. 25, 2024

Related U.S. Application Data

(60) Provisional application No. 63/480,823, filed on Jan. 20, 2023.

(51) Int. Cl.
*B60R 1/072* (2006.01)

(52) U.S. Cl.
CPC .................................... *B60R 1/072* (2013.01)

(58) Field of Classification Search
CPC .......... B60R 1/072; B60R 1/074; B60R 1/076
See application file for complete search history.

(56) References Cited

U.S. PATENT DOCUMENTS

| | | | |
|---|---|---|---|
| 6,349,450 | B1 | 2/2002 | Koops et al. |
| 6,550,103 | B2 | 4/2003 | Koops et al. |
| 6,907,643 | B2 | 6/2005 | Koops et al. |
| 6,977,619 | B2 | 12/2005 | March et al. |
| 7,407,203 | B2 | 8/2008 | Huizenga et al. |
| 7,887,202 | B1 | 2/2011 | Peterson |
| 8,333,492 | B2 | 12/2012 | Dingman et al. |
| 8,786,401 | B2 | 7/2014 | Sobecki et al. |
| 8,801,245 | B2 | 8/2014 | De Wind et al. |
| 8,915,601 | B2 | 12/2014 | Foote et al. |
| 9,067,541 | B2 | 6/2015 | Sobecki et al. |
| 9,346,403 | B2 | 5/2016 | Uken et al. |
| 9,487,142 | B2 | 11/2016 | Sobecki et al. |
| 9,827,913 | B2 | 11/2017 | De Wind et al. |
| 10,099,618 | B2 | 10/2018 | Foote et al. |
| 11,173,843 | B2 | 11/2021 | Peterson et al. |
| 11,325,535 | B2 | 5/2022 | Foote et al. |
| 11,396,264 | B2 | 7/2022 | Peterson et al. |
| 11,912,204 | B2 | 2/2024 | Peterson et al. |

(Continued)

*Primary Examiner* — Dany E Akakpo
(74) *Attorney, Agent, or Firm* — HONIGMAN LLP

(57) ABSTRACT

A vehicular exterior rearview mirror assembly includes a mirror head accommodating a mirror reflective element. An actuator is electrically operable to move the mirror head relative to a mounting base between a folded position and an extended position. The actuator includes a base portion that attaches at the mounting base and a pivot tube that extends from the base portion. The actuator includes a biasing mechanism that, when the mirror moves between the extended and folded positions, biases the mirror head relative to the mounting base in a direction parallel to a longitudinal axis of the pivot tube. The biasing mechanism includes a shell fixed relative to the mounting base, a longitudinally movable portion coupled to the mirror head and a torsion spring that biases the longitudinally movable portion in the direction parallel to the longitudinal axis.

19 Claims, 25 Drawing Sheets

(56) References Cited

U.S. PATENT DOCUMENTS

| | | | | |
|---|---|---|---|---|
| 12,331,567 | B2 | 6/2025 | Sobecki et al. | |
| 2010/0007463 | A1 | 1/2010 | Dingman et al. | |
| 2010/0088855 | A1 | 4/2010 | Ruse et al. | |
| 2018/0118111 | A1* | 5/2018 | Umino | B60R 1/076 |
| 2019/0039521 | A1* | 2/2019 | Yoshida | B60R 1/074 |
| 2020/0102773 | A1 | 4/2020 | Sobecki | |
| 2020/0223364 | A1 | 7/2020 | Peterson et al. | |
| 2020/0353867 | A1 | 11/2020 | Huizen et al. | |
| 2021/0213880 | A1 | 7/2021 | Esser | |
| 2021/0261053 | A1 | 8/2021 | Peterson et al. | |
| 2021/0316664 | A1 | 10/2021 | Baur | |
| 2021/0331625 | A1 | 10/2021 | Huizen et al. | |
| 2022/0018168 | A1 | 1/2022 | Cervone et al. | |
| 2022/0126751 | A1 | 4/2022 | Steffes et al. | |
| 2022/0282534 | A1 | 9/2022 | Peterson et al. | |
| 2022/0341226 | A1 | 10/2022 | Sobecki et al. | |
| 2024/0239267 | A1 | 7/2024 | LaCross et al. | |

* cited by examiner

1900

2000

2100

2200

2300

2400

2500

2600

2700

2800

2900

3000

3100

3200

3300

VEHICULAR ACTUATOR WITH VARIABLE FORCE PROFILE

CROSS REFERENCE TO RELATED APPLICATION

The present application claims the filing benefits of U.S. provisional application Ser. No. 63/480,823, filed Jan. 20, 2023, which is hereby incorporated herein by reference in its entirety.

FIELD OF THE INVENTION

The present invention relates generally to the field of exterior components for vehicles and, more particularly, to rearview mirror assemblies, powerfold exterior rearview mirror assemblies, and door handles for opening a side door and/or liftgate of a vehicle.

BACKGROUND OF THE INVENTION

It is known to provide a vehicular exterior rearview mirror assembly that includes a foldable mirror assembly, such as a powerfold mirror where the mirror head is pivotable via an actuator between a drive or use position and a folded or park position.

SUMMARY OF THE INVENTION

An exterior rearview mirror assembly for a vehicle may include a mirror head including a mirror reflective element and a mounting base configured for attachment at a side of the vehicle. The mirror head is movable relative to the mounting base between at least an extended position, where the mirror head is extended outward from the side of the vehicle so that the mirror reflective element is positioned to provide a rearward view at the side of the vehicle to a driver of the vehicle, and a folded position, where the mirror head is moved inward from the extended position toward the side of the vehicle. A powerfold actuator is electrically operated to move the mirror head relative to the mounting base between the folded position and the extended position. The powerfold actuator includes a base portion that attaches at the mounting base and a pivot tube that extends from the base portion. The pivot tube extends through a housing of the powerfold actuator. The mirror head is attached at the housing of the powerfold actuator and the mirror head and the housing of the powerfold actuator, when the powerfold actuator is operated, move together and in tandem about a longitudinal axis of the pivot tube of the powerfold actuator. The actuator includes a variable force biasing mechanism that, when the mirror moves between the extended position and the folded position, applies an axial biasing force between the mounting base and the mirror head along the longitudinal axis of the pivot tube to bias the mirror head away from the mounting base along the longitudinal axis of the pivot tube. The variable force biasing mechanism includes (i) a first portion that is fixed relative to the mounting base and that extends along the longitudinal axis of the pivot tube, and (ii) a second portion that is coupled to the mirror head and that, when the mirror head moves between the extended position and the folded position, moves relative to the first portion along the longitudinal axis of the pivot tube. The variable force biasing mechanism includes a torsion spring that biases the second portion of the variable force biasing mechanism along the longitudinal axis of the pivot tube to apply the axial biasing force between the mounting base and the mirror head along the longitudinal axis of the pivot tube.

A vehicular exterior door handle assembly may include a base portion configured to mount at a door of a vehicle equipped with the vehicular exterior door handle assembly, and a handle portion that includes a grasping portion. The handle portion is movable relative to the base portion between (i) a recessed position, where the grasping portion of the handle portion is at least partially recessed at the base portion, and (ii) a deployed position, where the grasping portion of the handle portion protrudes outward from the base portion so as to be graspable by a user. A variable torque biasing mechanism is mechanically coupled to the handle portion and configured to bias the handle portion relative to the base portion from the recessed position toward the deployed position. The variable torque biasing mechanism includes (i) a first portion that is fixed relative to the base portion and that extends along a longitudinal axis of the first portion, (ii) a second portion that is coupled to the first portion and that, when the handle portion moves between the recessed position and the deployed position, moves relative to the first portion along the longitudinal axis of the first portion, and (iii) a third portion that is coupled to the handle portion and is axially fixed relative to the first portion along the longitudinal axis of the first portion and that, as the handle portion moves between the recessed position and the deployed position, pivots about the longitudinal axis of the first portion. The variable torque biasing mechanism includes a compression spring that biases the third portion of the variable torque biasing mechanism about the longitudinal axis of the first portion to bias the handle portion relative to the base portion from the recessed position toward the deployed position.

These and other objects, advantages, purposes and features of the present invention will become apparent upon review of the following specification in conjunction with the drawings.

DESCRIPTION OF THE PREFERRED EMBODIMENTS

Figure 1:
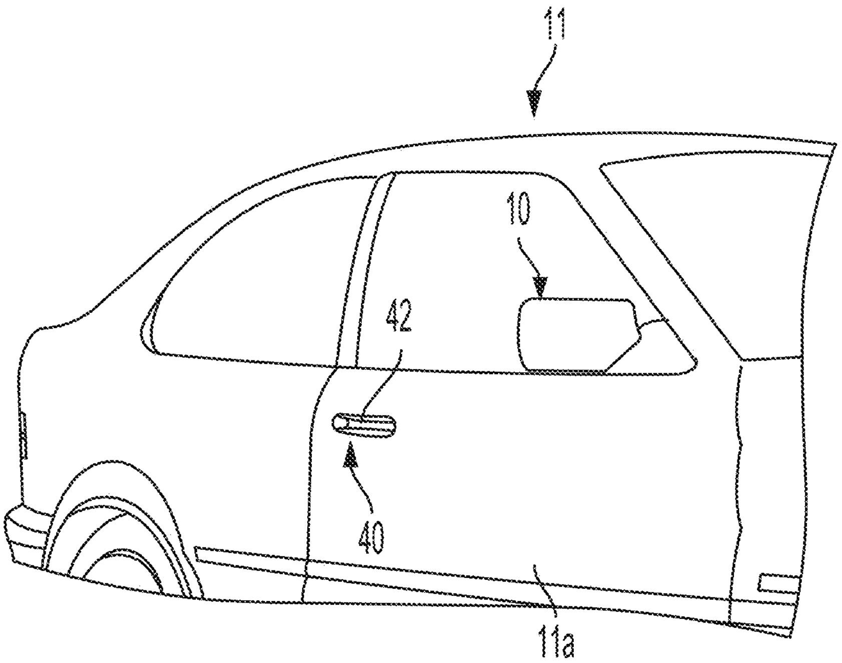
FIG. 1 is a perspective view of a vehicle equipped with a powerfold exterior rearview mirror assembly and a door handle assembly.
Figure 2:
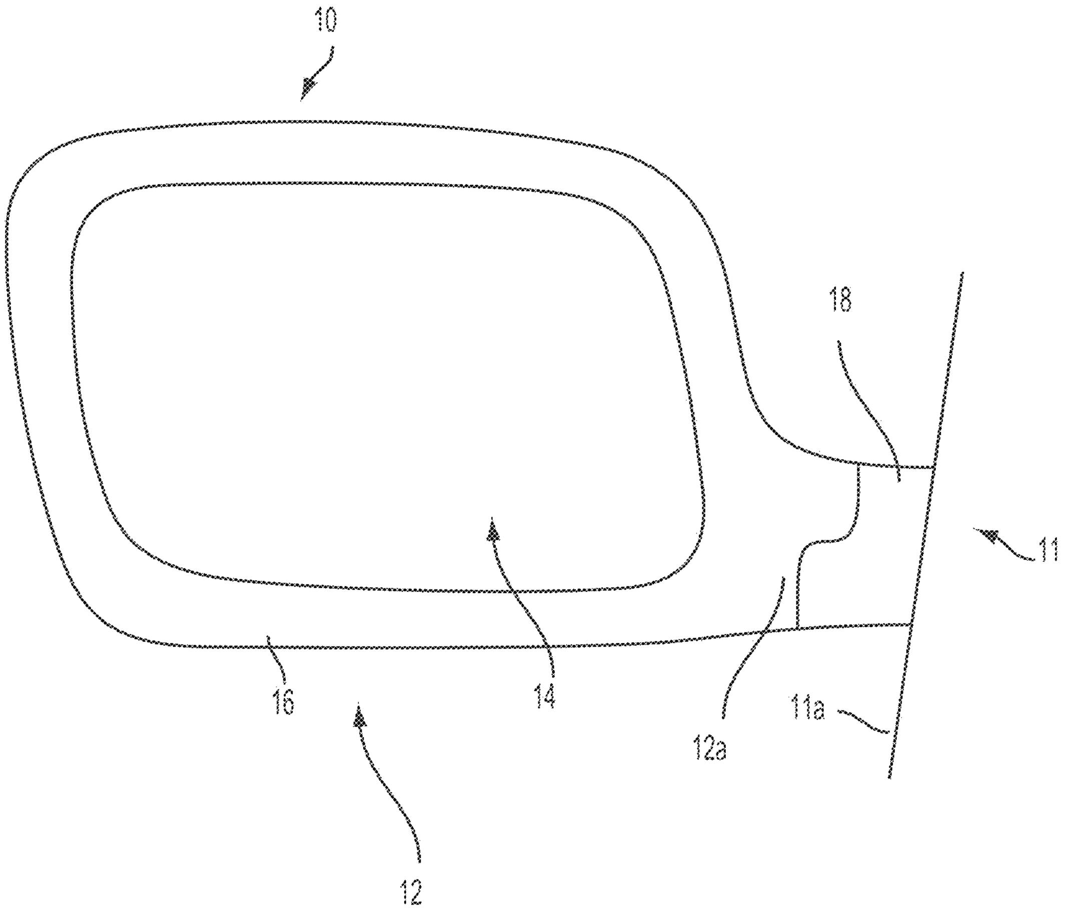
FIG. 2 is a view of the exterior rearview mirror assembly disposed at the side of the vehicle.

Referring now to the drawings and the illustrative embodiments depicted therein, a vehicle 11 is equipped with one or more vehicular components that are adjustable or pivotable or extendable or deployable relative to the vehicle 11 via a respective actuator assembly or adjustment mechanism coupled to the vehicle and the component (FIG. 1). For example, the vehicle 11 includes an exterior rearview mirror assembly 10 that includes a mirror head 12 that is pivotable and/or extendable relative to a respective side of the vehicle, and the vehicle 11 includes a door handle assembly 40 that includes a handle portion 42 that is pivotable and/or extendable from a base portion mounted at a door 11*a* of the vehicle 11. As discussed further below, the actuator assembly is operable to adjust or pivot or extend or deploy the vehicular component and apply a variable force profile (e.g., a variable axial force or a variable torque) across the range of motion of the vehicular component (e.g., a linear range of motion or a rotational range of motion). Although discussed herein with respect to the exterior rearview mirror assembly and the door handle assembly, it should be understood that aspects of the actuator assembly may be utilized with any suitable vehicular component, such as a charge port or fuel port cover, a pivotable headlamp or corresponding cover, a camera wing, and the like.

As shown in FIGS. 1-4, the exterior rearview mirror assembly 10 for the vehicle 11 includes the mirror head 12 and a mirror reflective element 14 received in and/or supported at or by a mirror shell or casing 16 of the mirror head portion 12. The mirror head portion 12 includes a mounting portion 12*a* that is pivotally or movably mounted to a mounting arm or base or portion 18. The mirror assembly 10 comprises a powerfold mirror (where the mirror head portion may be pivoted via electrical operation of an actuator assembly or adjustment device), and may comprise a breakaway mirror (where the mirror head portion may be manually pivoted about the mounting arm or base). The mounting arm or base 18 of the mirror assembly 10 is mounted at the side of a host or subject vehicle 11 equipped with the mirror assembly 10, with the reflective element 14 providing a rearward field of view along the respective side of the vehicle to the driver of the vehicle.

Figure 4:
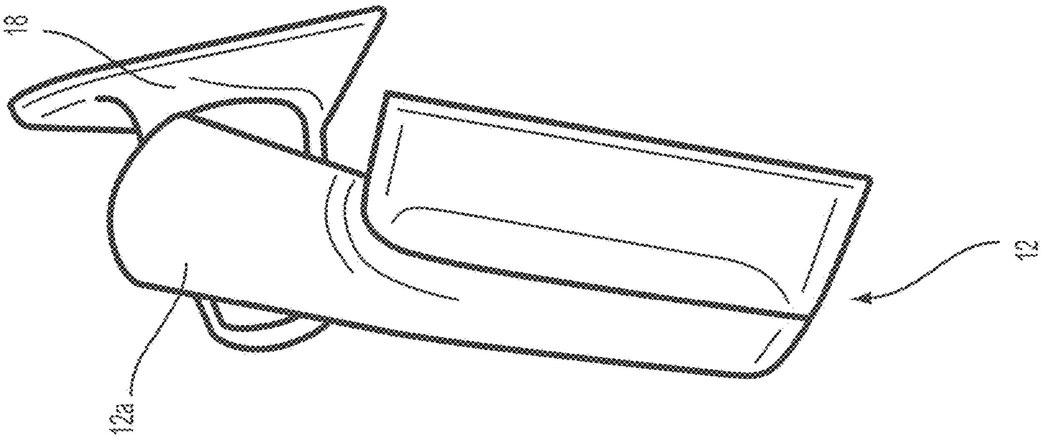
FIG. 4 is a view of the exterior rearview mirror assembly pivoted from the extended position to a folded or non-use position.
Figure 3:
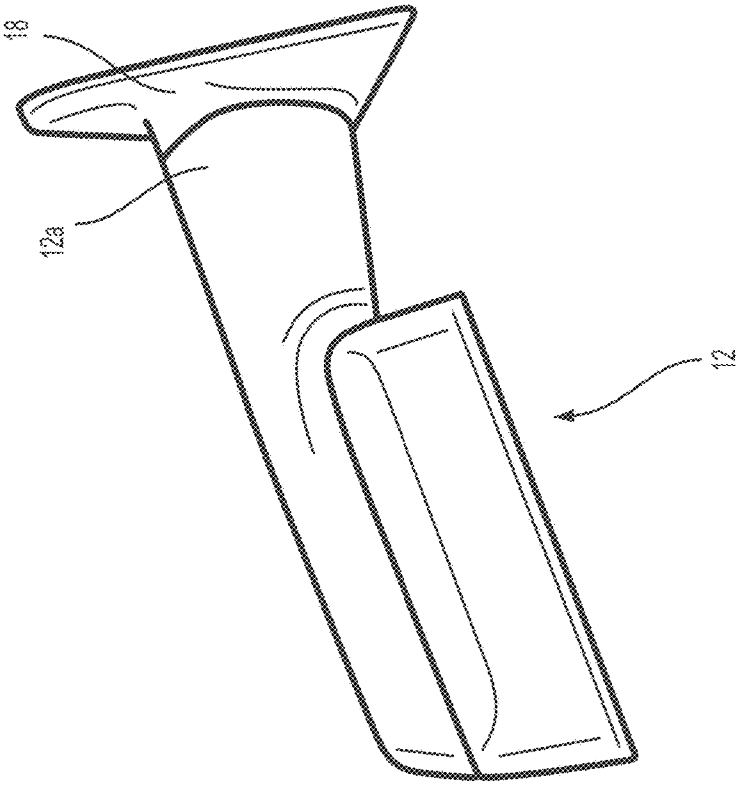
FIG. 3 is a view of the exterior rearview mirror assembly in an extended or use position.

The actuator is electrically operable to pivot the mirror head 12 relative to the mounting arm or base 18. The actuator operates, such as responsive to a user input, to pivot the mirror head 12 between a plurality of detent positions, including a use or drive or extended position (FIG. 3) and a folded or park position (FIG. 4). The mirror head is also pivotable manually to either the use or folded position. The actuator may pivot the mirror head 12 between the use position and the folded position responsive to the user input, or the actuator may pivot the mirror head automatically, such as upon completion of performance of a parking maneuver of the vehicle or upon locking or unlocking of the doors of the vehicle.

When in the use or drive position, the mirror head 12 is extended from the side 11*a* of the vehicle 11 so as to provide the rearward field of view along the side of the vehicle to the driver of the vehicle. When in the folded or park position, the mirror head 12 is folded or pivoted or rotated from the extended position toward the side 11*a* of the vehicle 11, such that the mirror reflective element 14 may be facing the side of the vehicle and does not provide the rearward field of view along the side of the vehicle. Optionally, the mirror head 12 may also be pivoted to a fully forward position, where the mirror head 12 is folded or pivoted or rotated away from the folded position and beyond the use position, such that the mirror reflective element 14 may face sideward or forward away from the vehicle side 11*a* of the vehicle 11. The mirror head 12 may pivot toward the fully forward position manually, such as upon contact or a collision with an object. A seal may be disposed along the interface between the mounting portion 12*a* of the mirror head 12 and the mounting arm or base 18, such as to reduce noise or damage from vibration of the mirror head 12 relative to the mounting base 18 and/or to preclude moisture or debris from entering the mirror head 12 or mounting base 18. The powerfold mirror actuator may utilize aspects of the actuators described in U.S. Pat. Nos. 7,887,202; 9,487,142; 11,396,264 and/or 9,067,541, and/or U.S. Publication Nos.

US-2020-0223364; US-2021-0261053 and/or US-2022-0126751, and/or International Publication No. WO 2019/035078, which are all hereby incorporated herein by reference in their entireties. The mirror assembly may utilize aspects of the mirror assemblies described in U.S. Publication Nos. US-2021-0331625; US-2021-0316664; US-2021-0213880; US-2020-0353867 and/or US-2020-0223364, and/or U.S. Pat. Nos. 11,325,535; 10,099,618; 9,827,913; 9,487,142; 9,346,403 and/or 8,915,601, which are all hereby incorporated herein by reference in their entireties.

Figure 5:
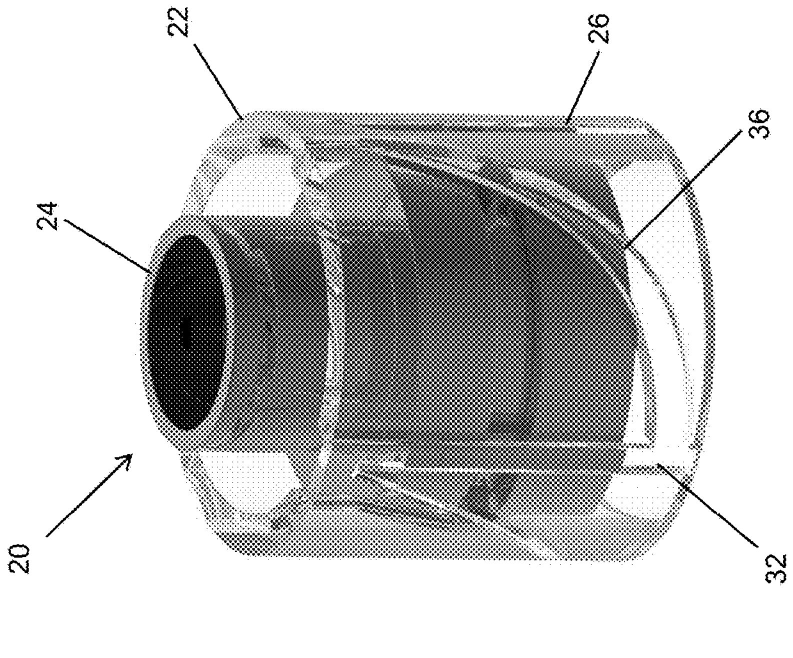
FIG. 5 is a perspective view of a non-linear compression mechanism of an actuator assembly operable to pivot the mirror head between the extended and folded positions.
Figure 8:
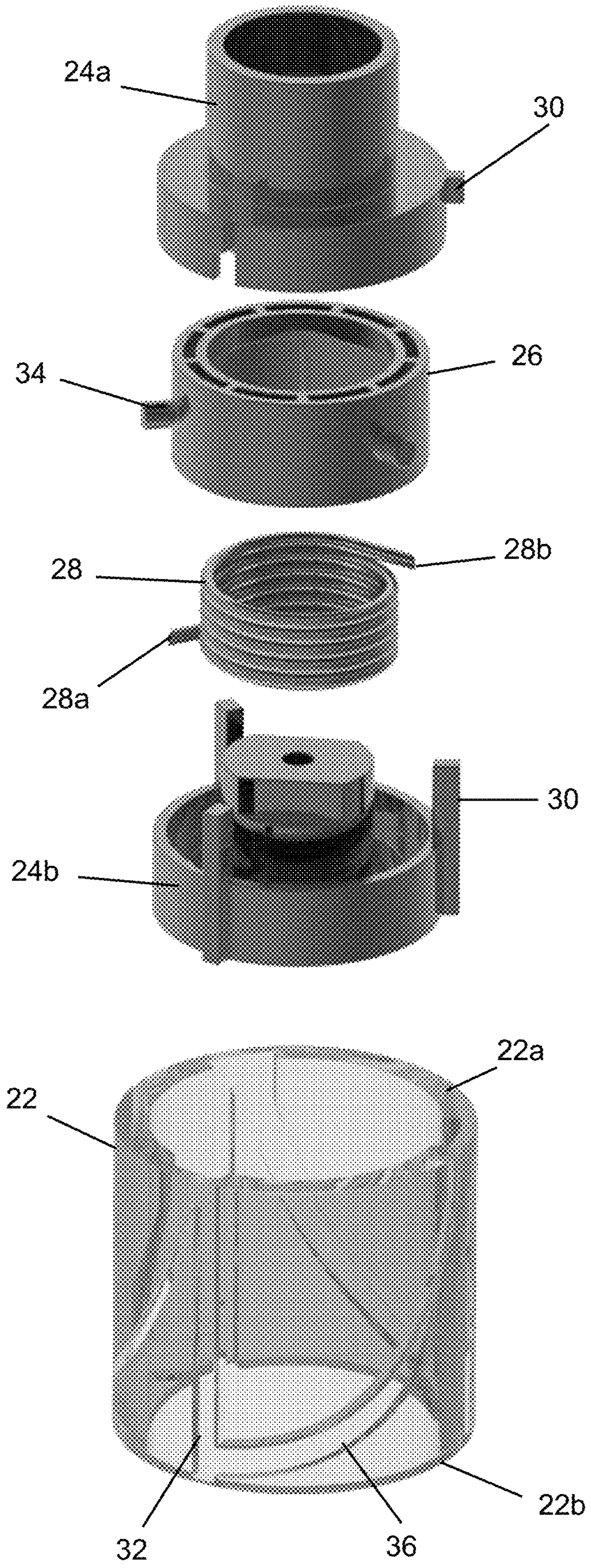
FIG. 8 is an exploded view of the non-linear compression mechanism.
Figure 9:
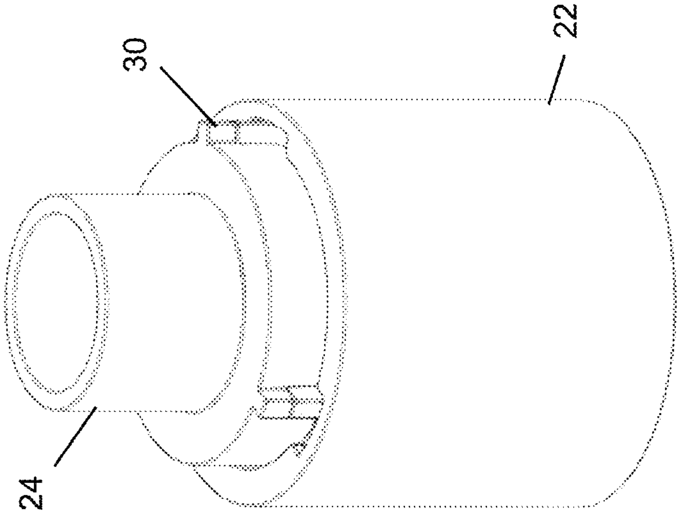
FIGS. 9-11 are perspective views of the non-linear compression mechanism, showing the sled received along a channel of a shell of the non-linear compression mechanism.
Figure 10:
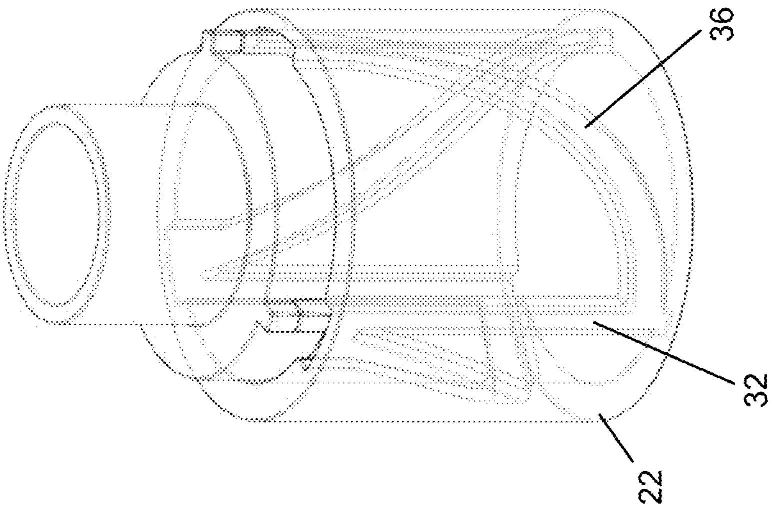
Figure 11:
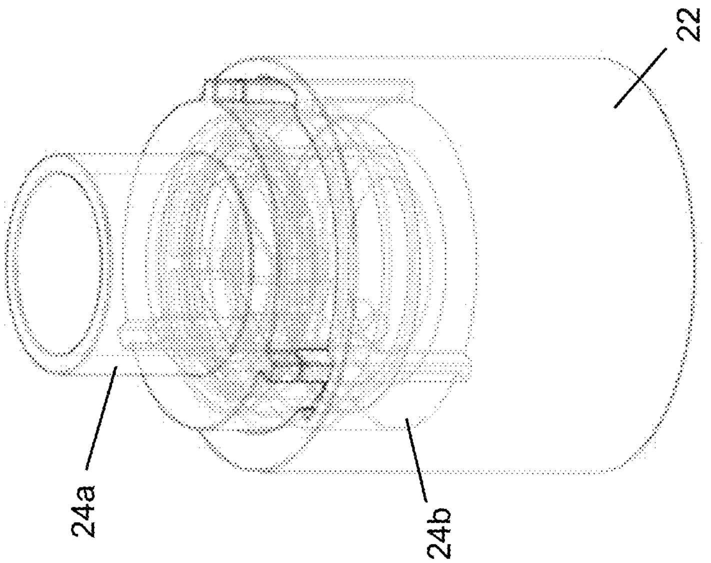
Figure 13:
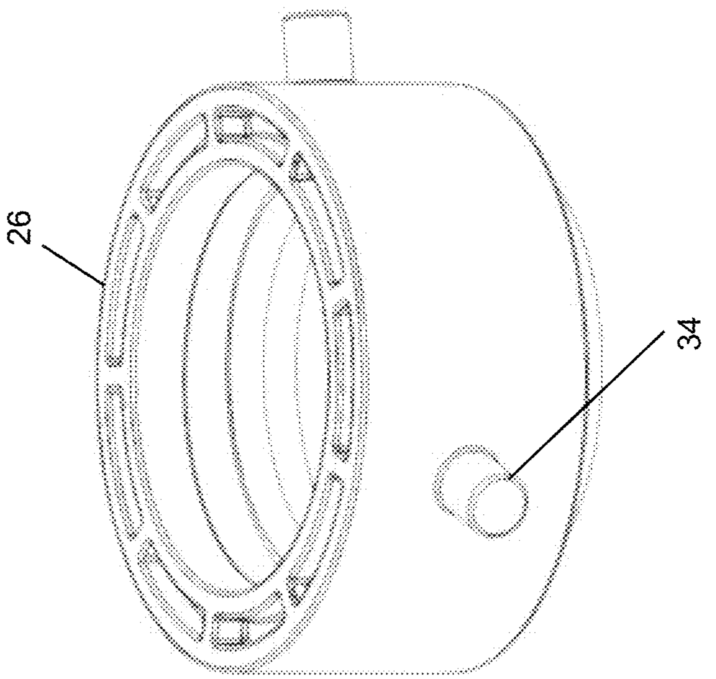
FIG. 13 is a perspective view of the rotary slider of the non-linear compression mechanism.

The actuator assembly may include a non-linear compression mechanism 20 that applies an axial force profile along a linear range of motion (FIG. 5), such as a variable axial force profile or a constant axial force profile. For example, the non-linear compression mechanism 20 may be disposed along a pivot tube of the mirror assembly 10 and bias the mirror head 12 away from the mounting base 18 so that, with the mirror head 12 in the extended position and when the actuator assembly is operated to pivot the mirror head to the folded position, the non-linear compression mechanism 20 urges the mirror head 12 and/or assists the actuator in moving the mirror head 12 away from the mounting base 18, such as to provide clearance or separation between the mirror head 12 and the mounting base 18 (and prevent damage to the seal between the mirror head and mounting base) as the mirror head 12 pivots relative to the mounting base 18. In other words, the non-linear compression mechanism 20 may be in a recessed position or energized position when the actuator is in a detent position (e.g., the mirror head is in the extended position), and the mechanism may release or extend when the actuator moves from the detent position (e.g., the mirror head is moved from the extended position toward the folded position). The variable force profile provided by the non-linear compression mechanism 20 may result in greater axial force at the beginning of the range of motion (i.e., as the mirror head begins pivoting from the extended position), such as to more reliably separate the mirror head and mounting base and/or to overcome potential interference like ice buildup at the seal between the mirror head 12 and mounting base 18. As the mirror head 12 pivots along its range of motion and the compression mechanism 20 is extended, the axial force provided by the non-linear compression mechanism 20 may decrease, such as to reduce strain on an electrically operable motor and/or forces experienced by detent surfaces of the actuator assembly.

The non-linear compression mechanism may be utilized in applications where a normal compression spring may typically be used, such as to provide a biasing force to separate two components or to provide an absorbing force between two components moving toward one another. Rather than following the usual relationship governing compression springs of Hooke's Law (where spring force is equal to the negative of a spring constant multiplied by a compression or stretch distance of the spring), the non-linear compression mechanism may not follow a linear force relationship. Thus, the axial force is no longer directly related to the amount of linear movement.

Referring to FIGS. 5-15, the non-linear compression mechanism or biasing mechanism 20 includes a body or shell portion 22 that is fixed (such as fixed relative to the mounting base 18 of the mirror assembly) and a sled or movable portion 24 that is movable within a cylindrical channel of the shell 22 that extends along a longitudinal axis of the shell 22. The sled 24 may be coupled to the mirror head 12. The shell 22 comprises a body with the cylindrical channel extending along the longitudinal axis and the sled 24 comprises a cylindrical body that moves along the channel of the shell 22.

Figure 6:
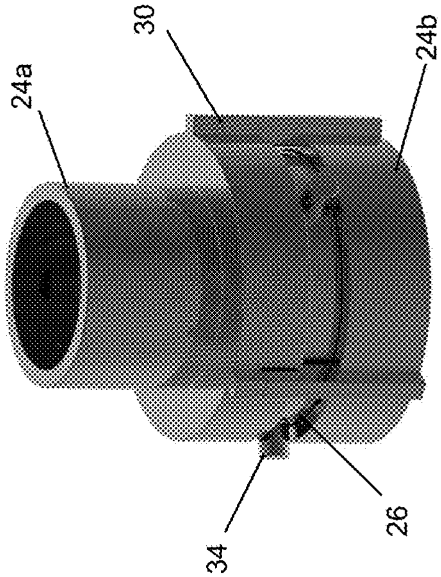
FIG. 6 is a perspective view of a rotary slider accommodated by a sled of the non-linear compression mechanism.
Figure 12:
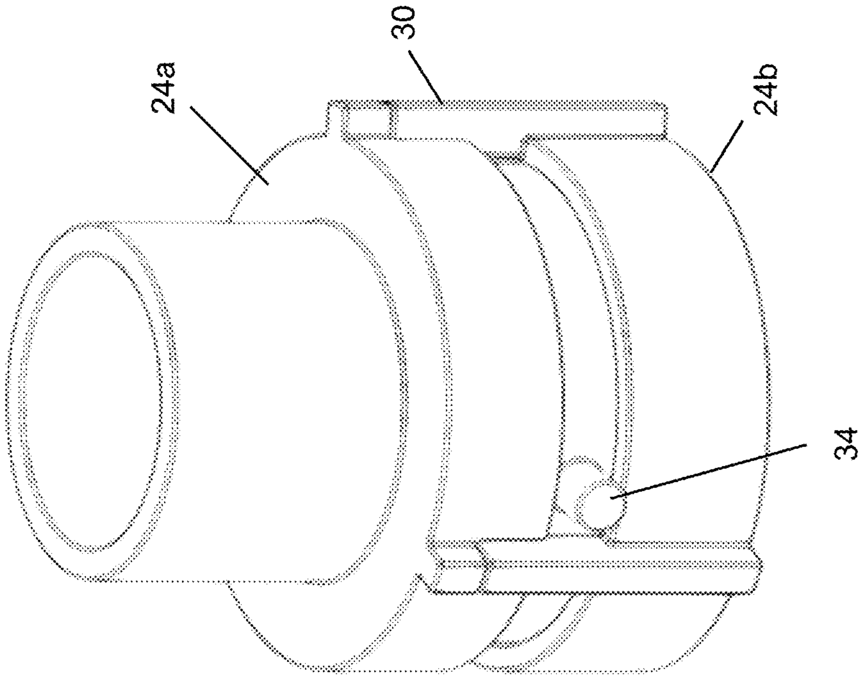
FIG. 12 is a perspective view of the sled and rotary slider of the non-linear compression mechanism.

As shown in FIGS. 6 and 12, the sled 24 includes a first or upper portion or sled cap 24*a* that couples to a second or lower portion or sled base 24*b*. A rotary slider 26 (FIG. 13) and a torsion spring 28 (FIG. 14) are accommodated between the sled cap 24*a* and the sled base 24*b*. The sled 24 is keyed to the shell 22 to control rotation of the torsion spring 28, such as via one or more protrusions 30 disposed along the outer circumference of the sled 24 and received along respective linear channels 32 formed along the inner surface of the channel of the shell 22 and extending along the longitudinal axis of the shell 22. Respective portions of the protrusions 30 may be disposed at the sled cap 24*a* and the sled base 24*b* and the sled cap 24*a* may be keyed to the sled base 24*b* via the protrusions 30. Thus, the sled 24 is rotationally fixed and does not rotate relative to the shell 22 as the sled moves axially along the channel of the shell 22.

Figure 15:
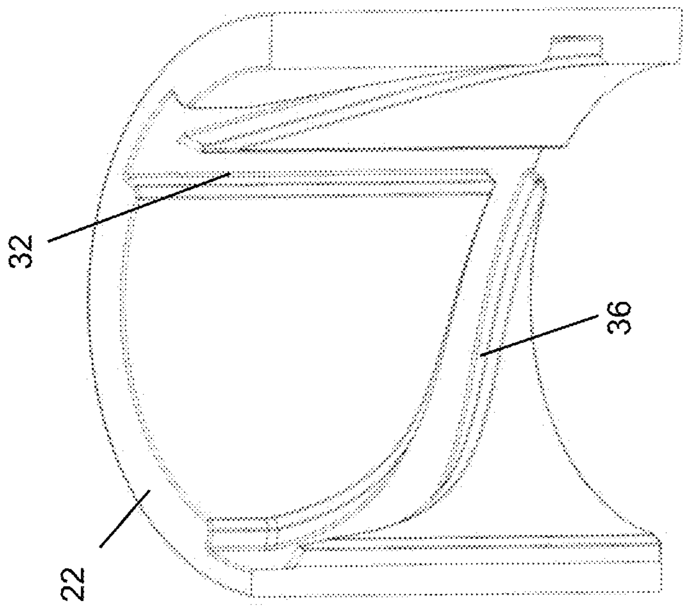
FIG. 15 is a sectional view of the shell of the non-linear compression mechanism, showing the linear channels and ramps formed along the inner surface of the channel of the shell.
Figure 14:
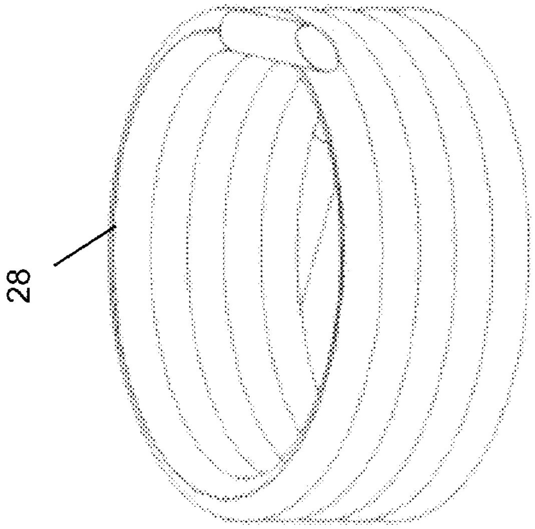
FIG. 14 is a perspective view of the torsion spring of the non-linear compression mechanism.
Figure 16C:
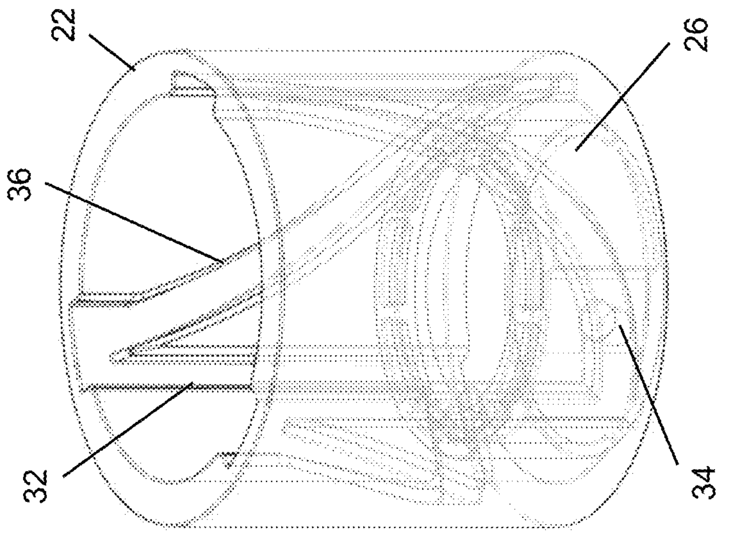
FIGS. 16A-16C are perspective views of the non-linear compression mechanism as the rotary slider is moved from a first end of the shell to a second end of the shell.
Figure 16B:
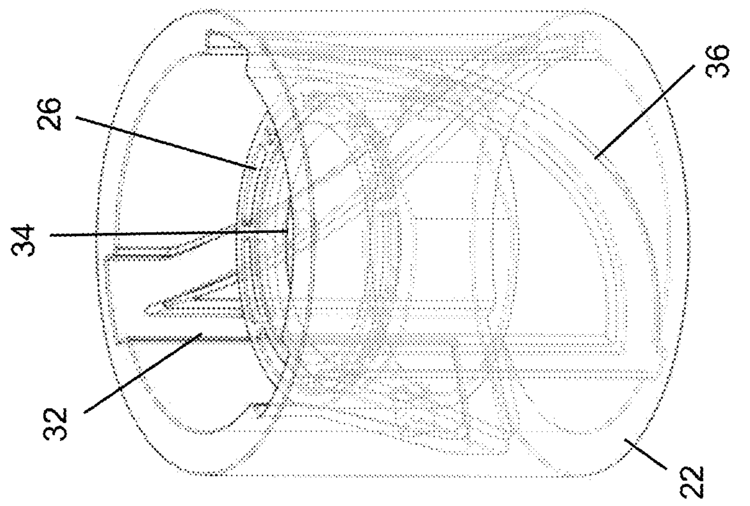
Figure 16A:
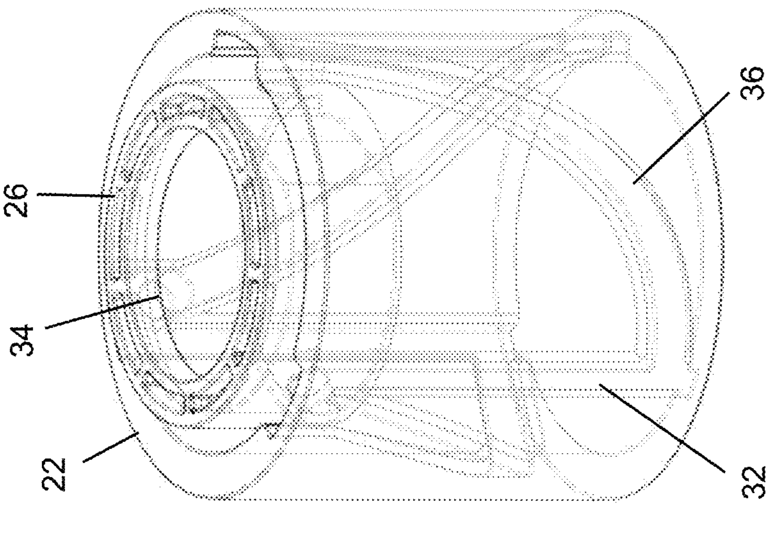
Figure 17A:
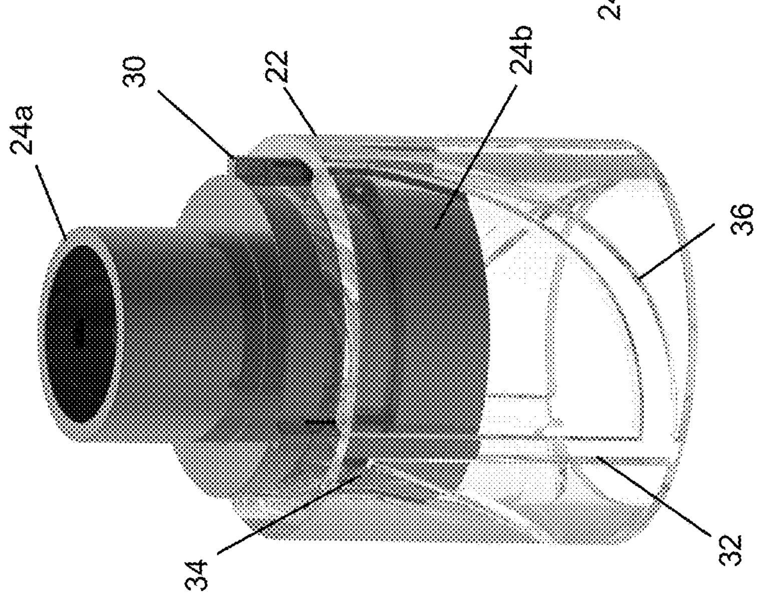
FIGS. 17A-17C are perspective views of the non-linear compression mechanism as the sled and rotary slider are moved from the first end of the shell to the second end of the shell.
Figure 17B:
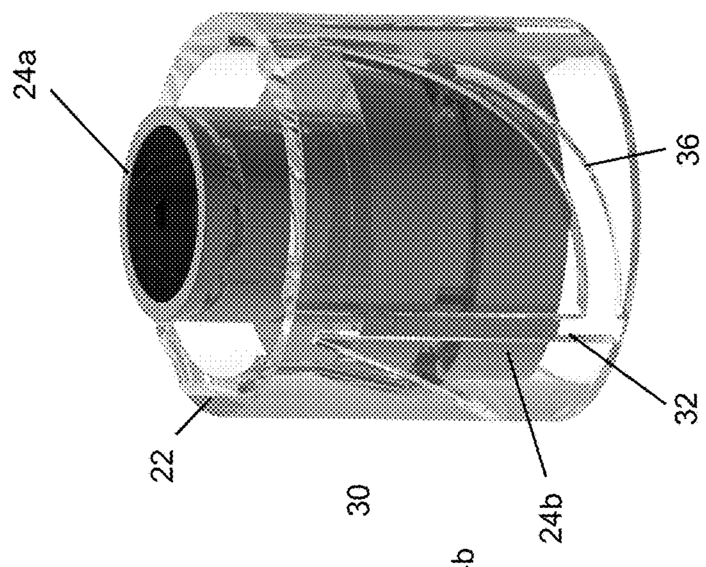
Figure 17C:
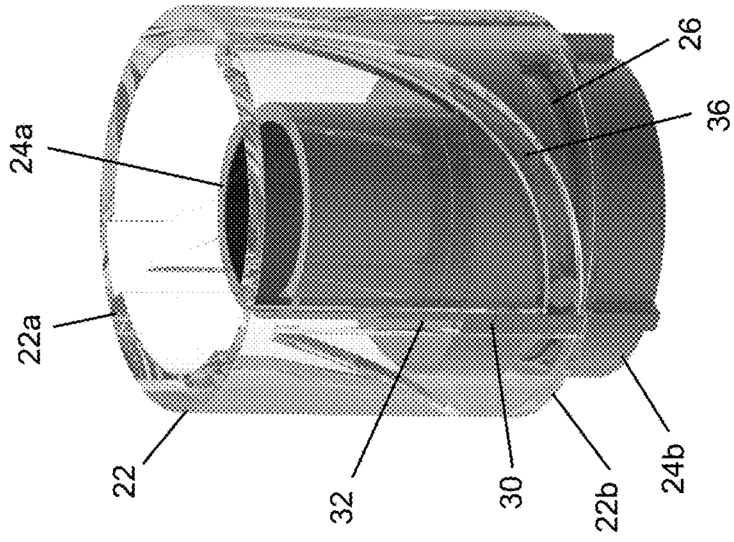

The rotary slider 26 disposed between the sled cap 24*a* and the sled base 24*b* includes one or more protrusions or pins 34 that extend radially from the rotary slider 26 (such as through respective apertures or slots formed through the sled or gaps between the sled cap and sled base) and are received along respective ramps 36 formed along the inner surface of the channel of the shell 22. As shown in FIG. 15, the ramps 36 are angled or curved relative to the longitudinal axis of the shell 22 so that, as the sled 24 moves along the longitudinal axis of the shell, the pins 34 of the rotary slider 26 travel along the ramps 36 and the ramps 36 guide rotation of the rotary slider 26 relative to the sled 24.

Figure 7:
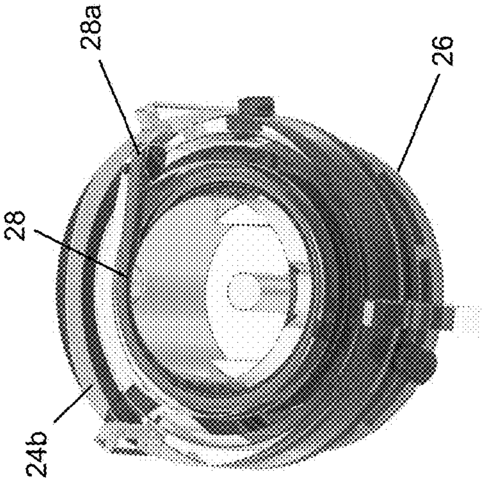
FIG. 7 is a perspective view of the rotary slider, a torsion spring, and a sled base of the non-linear compression mechanism, where the sled base is transparent to show the torsion spring.

A first end or leg 28*a* of the torsion spring 28 is coupled to the sled 24 (such as to the sled base 24*b*, as shown in FIG. 7) and a second end or leg 28*b* of the torsion spring 28 is coupled to the rotary slider 26. Thus, as the sled 24 moves along the channel of the shell 22, the rotary slider 26 rotates relative to the sled 24 and winds or unwinds the torsion spring 28.

Referring to FIGS. 16A-16C and 17A-17C, the sled 24 may be assembled to the shell 22 such that the rotary slider 26 winds the torsion spring 28 (increases the spring torque) as the sled 24 is pushed down along the shell 22. That is, as the non-linear compression mechanism 20 moves from a first or extended position (FIGS. 16A and 17A), where the sled 24 is at a first or upper end portion 22*a* of the shell 22 and the pins 34 of the rotary slider 26 are at first or upper end portions of the ramps 36, toward a second or recessed position (FIGS. 16C and 17C), where the sled 24 is at an opposite second or lower end portion 22*b* of the shell 22 and the pins 34 of the rotary slider 26 are at opposite, second or lower end portions of the ramps 36, the rotary slider 26 rotates or pivots relative to the sled 24 and thus rotates or pivots the second end 28*b* of the torsion spring relative to the first end 28*a* fixed to the sled 24 to wind the torsion spring 28. The sled 24 does not rotate relative to the shell 22 and only moves linearly along the longitudinal axis of the shell 22.

Thus, the axial motion of the sled 24 relative to the shell 22 from the extended position to the recessed position causes the rotary slider 26 to rotate relative to the sled 24 and increases the spring torque available from the torsion spring 28. That is, as the sled 24 is compressed or moved axially along the shell 22 toward the recessed position (i.e., as the biasing mechanism is compressed), the spring force of the torsion spring 28 increases according to the rotation of the rotary slider 26 and torsion spring 28 relative to the shell 22. The sled 24 may be releasably secured at the recessed position (such as when the mirror head is in the detent state at the extended position) so that the spring force is stored in the torsion spring 28 and the sled 24 is biased toward the extended position. When the sled 24 is allowed to move relative to the shell 22 (such as when the actuator assembly begins moving the mirror head from the extended position toward the folded position), the spring torque urges the pins 34 along the ramps 36 and the sled 24 moves axially along the shell 22 from the recessed position toward the extended position and releases the force stored in the torsion spring 28.

In other words, as the sled 24 is pushed down along or into the shell 22, the torsion spring 28 is wound, resulting in higher or increased torque on the rotary slider pins 34. The pins 34 push on the ramps 36, yielding a force in the axial direction. Based on an angle of the ramps 36 relative to the longitudinal axis of the shell 22 (i.e., the ramp angle), the amount of compressing force required to push the sled 24 into the shell 22 may vary along the longitudinal axis of the shell 22 and thus throughout the entire range of axial movement. The axial force required to move the sled 24 along the shell 22 toward the recessed position may be substantially equal to the axial force provided by the sled 24 in the opposite direction when the torsion spring 28 unwinds and moves the sled 24 along the shell 22.

In some examples, the sled 24 may be assembled to the shell 22 such that the rotary slider 26 winds the torsion spring 28 (increases the spring torque) as the sled 24 is moved upward along the shell 22 from the recessed position toward the extended position. Accordingly, the torsion spring 28 is wound as the sled 24 is moved upward or extended relative to the shell 22 so that the biasing force stored in the torsion spring 28 urges the sled 24 toward the recessed position. For example, the mechanism 20 may be coupled to a component where quick retraction of the component from a detent state is desired. In other examples, the sled may be assembled to the shell such that the rotary slider unwinds the torsion spring 28 (decreases the spring torque) as the sled is moved upward along the shell from the recessed position toward the extended position, or the torsion spring may be at its resting (not wound or unwound) state with the sled at a middle region of the shell, such that the rotary slider winds the spring as the sled is moved in one direction and unwinds the spring as the sled is moved in the other direction.

The ramp angle controls the ratio between spring rotation and the amount of travel by the sled 24. Thus, the ramp angle also controls how much of the available force (torsion spring force) is directed in the axial direction of the spring (compression force). For example, a relatively larger ramp angle relative to the longitudinal axis of the shell 22 results in greater rotation of the rotary slider 26 over the same distance of travel of the sled 24 compared to a relative smaller ramp angle, and the spring torque is released as axial force over a shorter range of motion when the ramp angle is larger. In other words, greater rotation of the rotary slider 26 yields more torque available for conversion into the axial direction.

Figure 18:
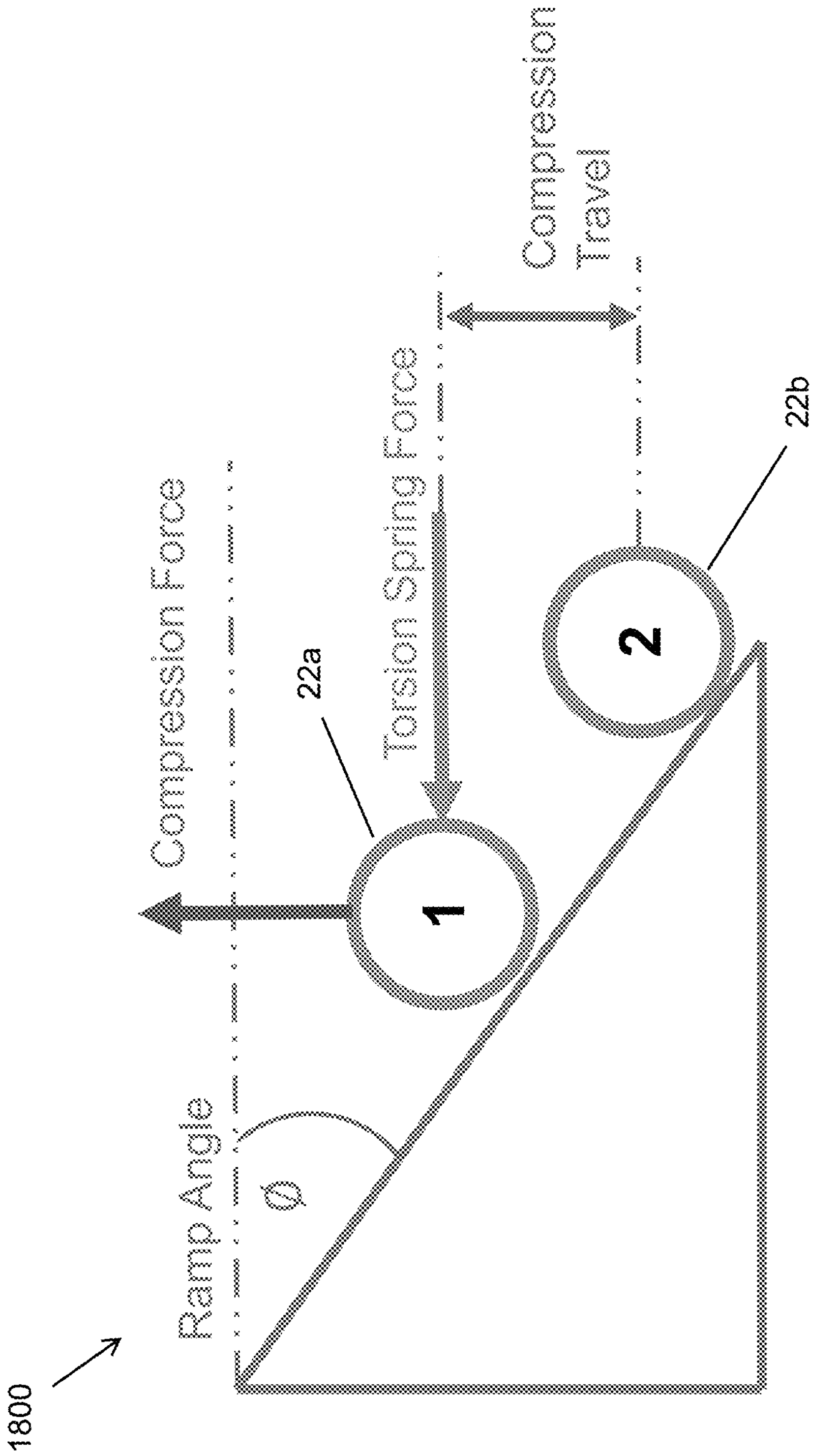
FIG. 18 is a diagram showing a relationship between the torsion spring force and axial force as the sled moves along the shell of the non-linear compression mechanism.
Figure 19:
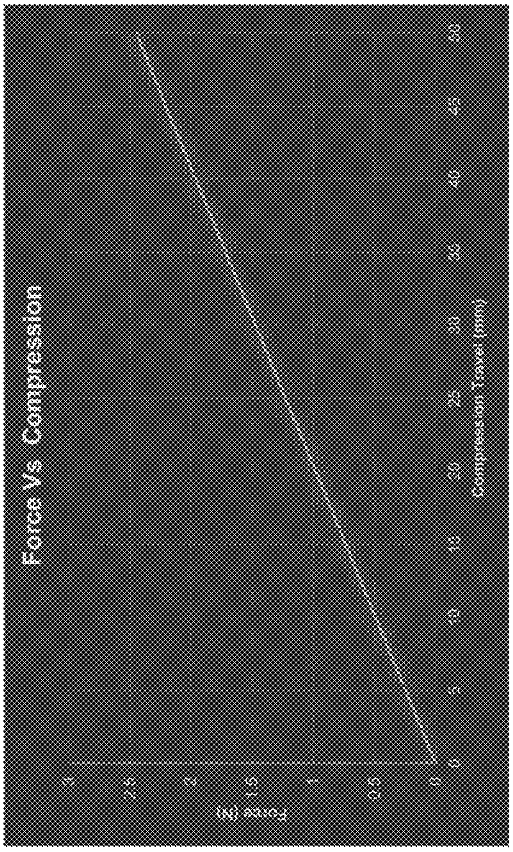
FIGS. 19 and 20 are diagrams showing a linear relationship between the torsion spring force and axial travel of the sled along the shell when the ramps of the shell have a constant ramp angle.
Figure 20:
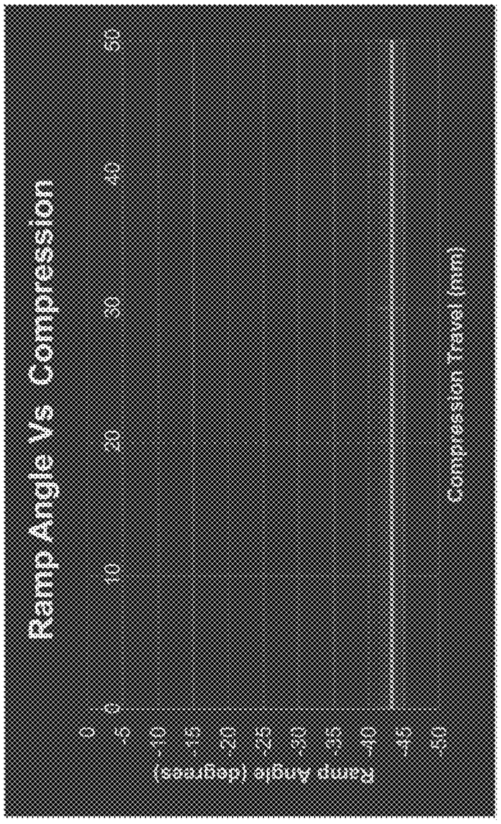

As shown by the diagram 1800 in FIG. 18, a constant or uniform ramp angle between the first end 22*a* of the shell 22 and the second end 22*b* of the shell 22 may result in a linearly increasing force as the sled 24 winds the torsion spring 28 (i.e., travels from the first end 22*a* toward the second end 22*b*). In other words the force required to axially move the sled 24 increases linearly as the sled 24 moves along the shell 22 from the first end 22*a* toward the second end 22*b*. The diagram 1900 of FIG. 19 shows the linear increase in the torsion spring force as the sled 24 travels along the shell 22 according to the constant ramp angle depicted by the diagram 2000 of FIG. 20. With the sled 24 in the recessed position at the second end 22*b* of the shell 22, the torsion spring force biases the sled 24 toward the first end 22*a* of the shell 22. Thus, when the sled 24 travels along the shell 22 from the second end 22*b* toward the first end 22*a* and the torsion spring force is released, the torsion spring force moves the sled 24 axially and may apply a linearly decreasing force in the axial direction. In other words, the axial force of the compression mechanism 20 may be greatest when the sled 24 is first released or initially moves relative to the shell 22 and the axial force may decrease at a constant rate as the sled 24 moves axially along the shell 22.

Figure 21:
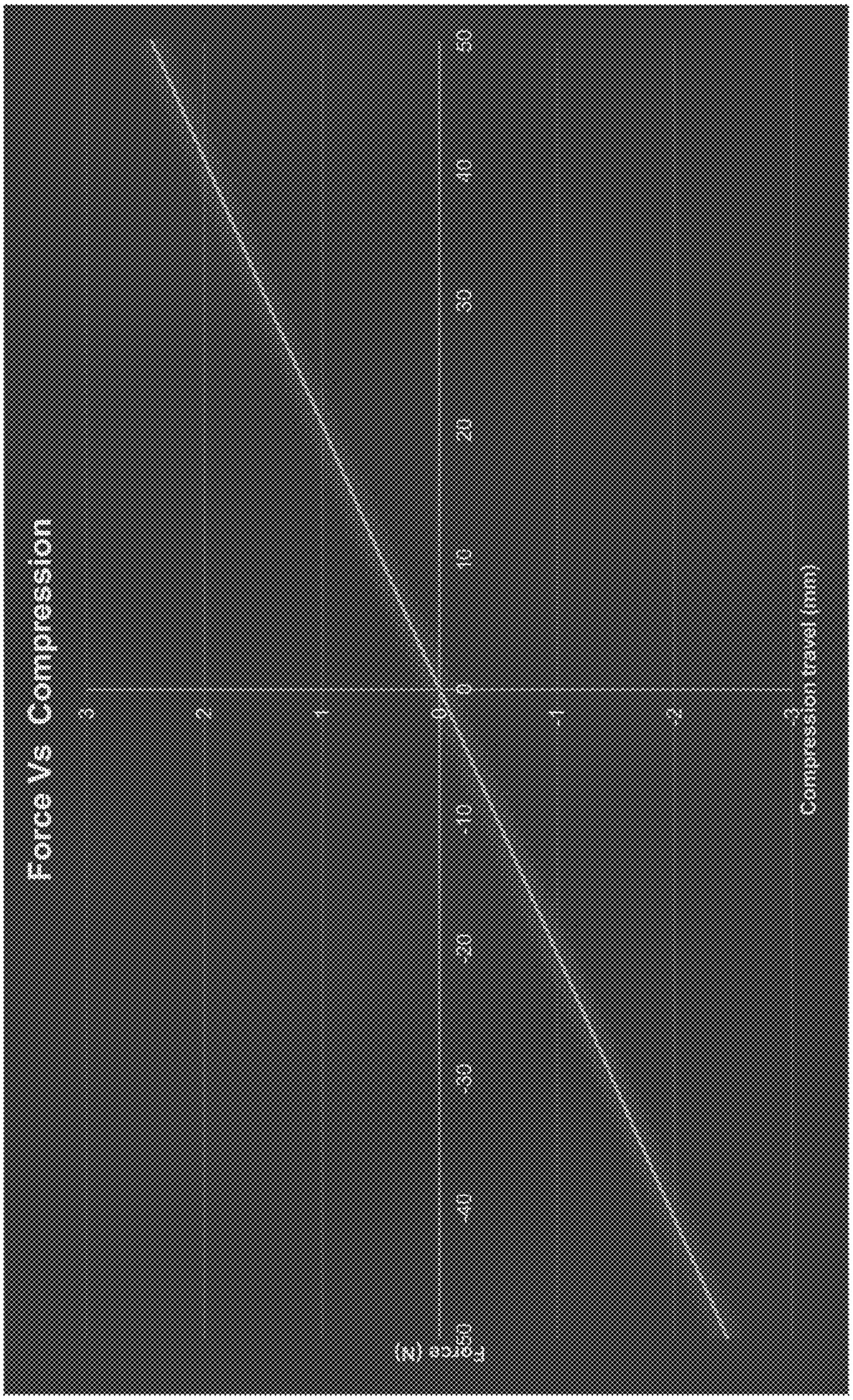
FIGS. 21-23 are diagrams showing a linear relationship between the torsion spring force and axial travel of the sled along the shell when the ramps of the shell have constant ramp angles extending on opposing sides of a central region of the shell.
Figure 22:
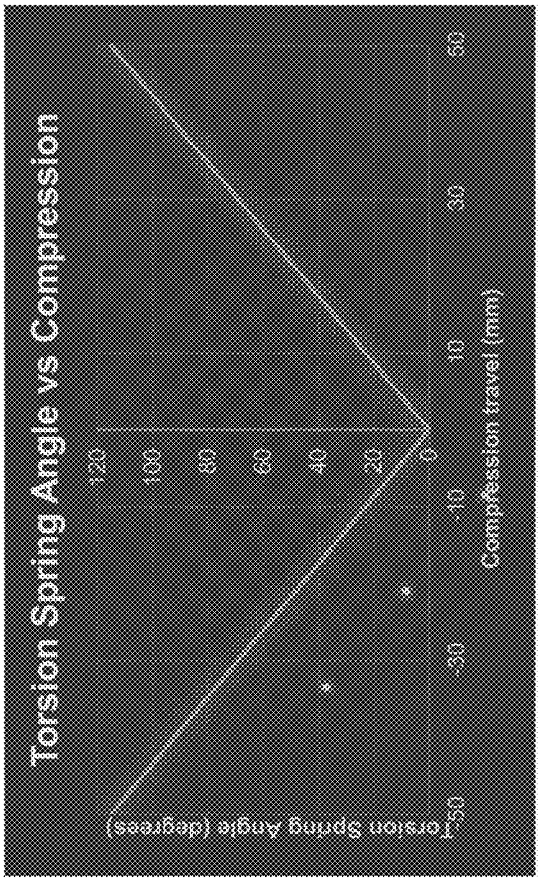
Figure 23:
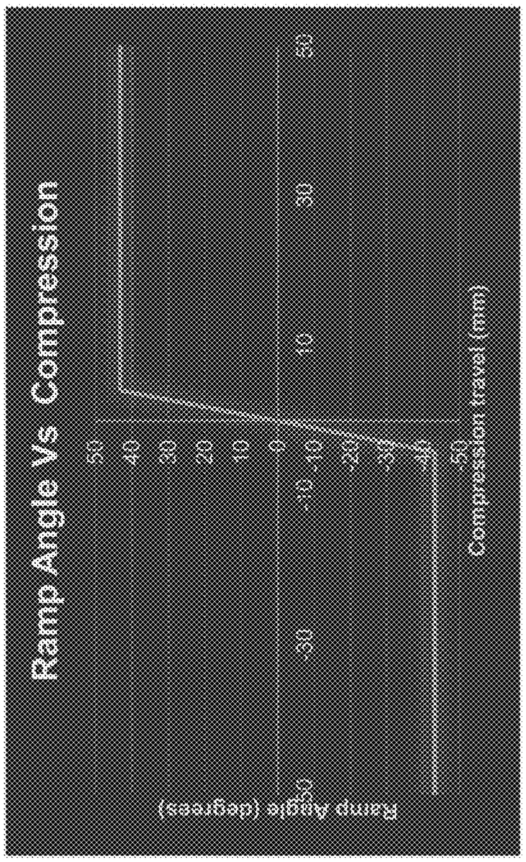

The compression mechanism 20 may be configured to provide a self-centering biasing force where the sled 24 is biased toward a central region of the sled 22 between the first end portion 22*a* and the second end portion 22*b*. The diagram 2100 in FIG. 21 depicts the spring force stored in the torsion spring 28 as the sled 24 moves axially along the shell 22 in a first direction away from the central region of the shell and in an opposite second direction away from the central region of the shell. The diagram 2200 in FIG. 22 depicts the winding torsion spring angle as the sled 24 moves in the first direction (e.g., positive axial movement) from the central region and in the second direction (e.g., negative axial movement) from the central region. The diagram 2300 in FIG. 23 depicts a ramp profile that is parallel to the longitudinal axis of the shell 22 (i.e., zero degree ramp angle) at the central region with constant ramp angles extending in the first and second directions from the central region. Thus, the sled 24 is urged toward the central region when the sled is moved from the central region in the first and second directions, such as when the sled 24 is positively or negatively moved in the axial direction relative to the central region of the shell 22.

Figure 24:
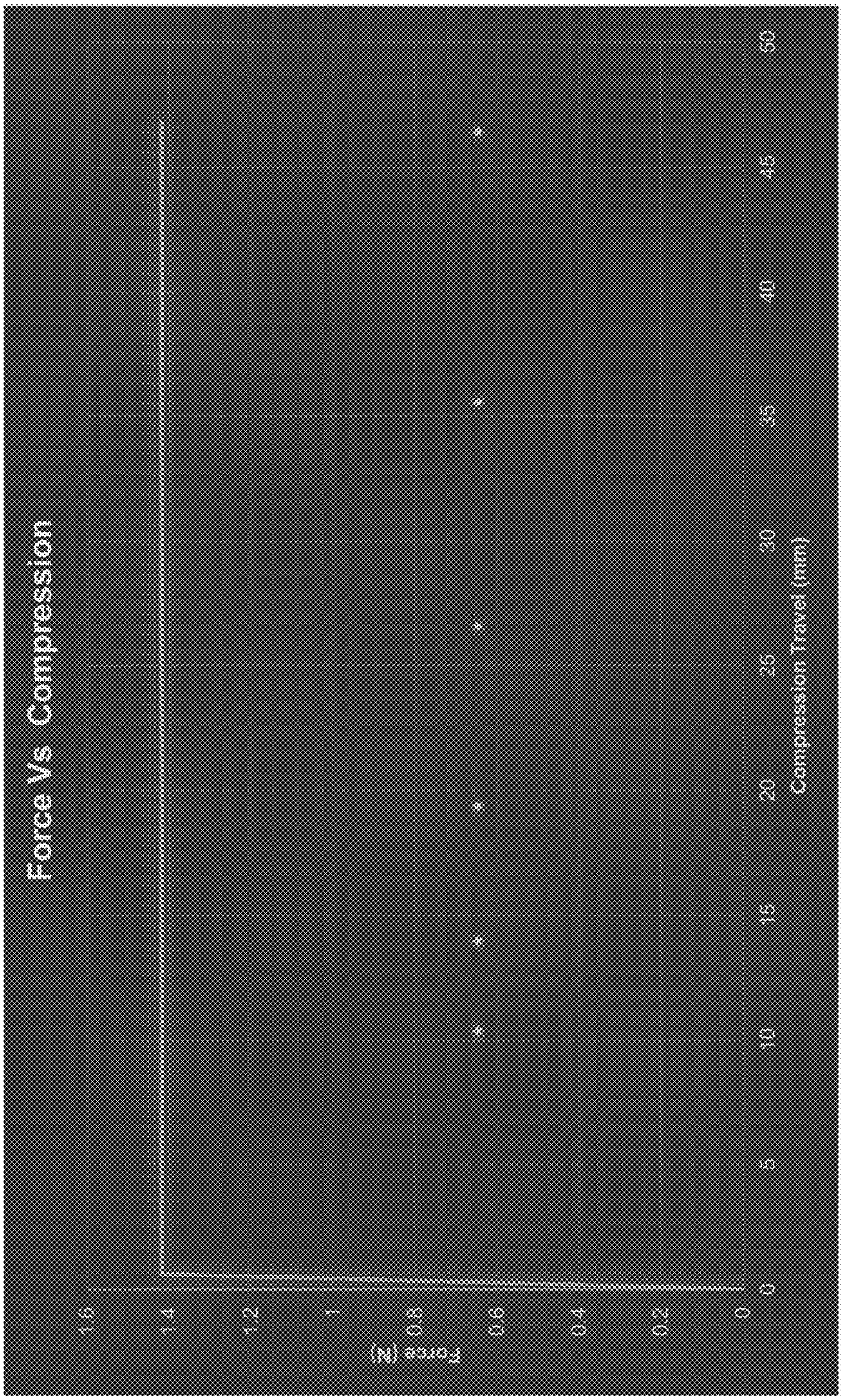
FIGS. 24-26 are diagrams showing a constant torsion spring force as the sled travels axially along the shell when the ramps of the shell have a decreasing ramp angle.
Figure 25:
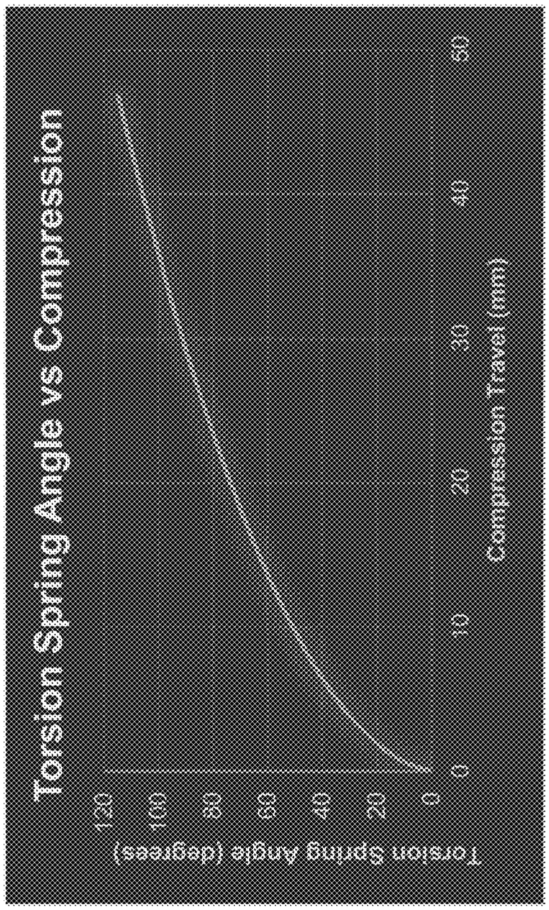
Figure 26:
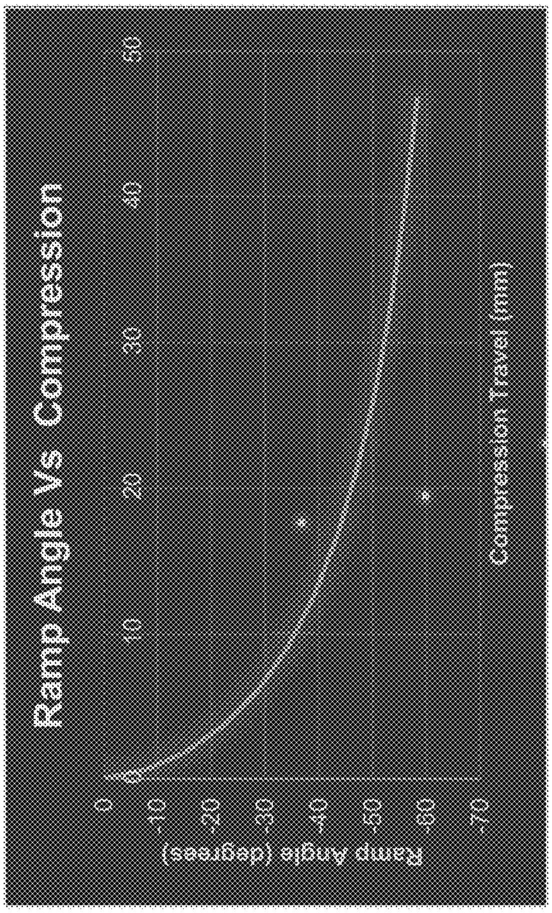

As shown in FIGS. 24-26, the compression mechanism may be configured to provide a substantially constant force profile when the ramp angle decreases from the first end 22*a* toward the second end 22*b* of the shell 22. That is, the force required to axially move the sled 24 toward the recessed position (and thus the force released when the sled 24 is released and axially moves toward the extended position) may be substantially constant (such as within about 0.1 Newtons) along the range of motion of the sled 24 relative to the shell 22. The diagram 2400 in FIG. 24 depicts the constant force profile along the range of motion. The diagram 2500 in FIG. 25 shows that, as the sled 24 moves from the first end 22*a* toward the second end 22*b*, the winding angle of the torsion spring 28 increases at a decreasing rate, as controlled by the decreasing ramp angle shown by the diagram 2600 in FIG. 26, to provide the constant force profile.

Figure 27:
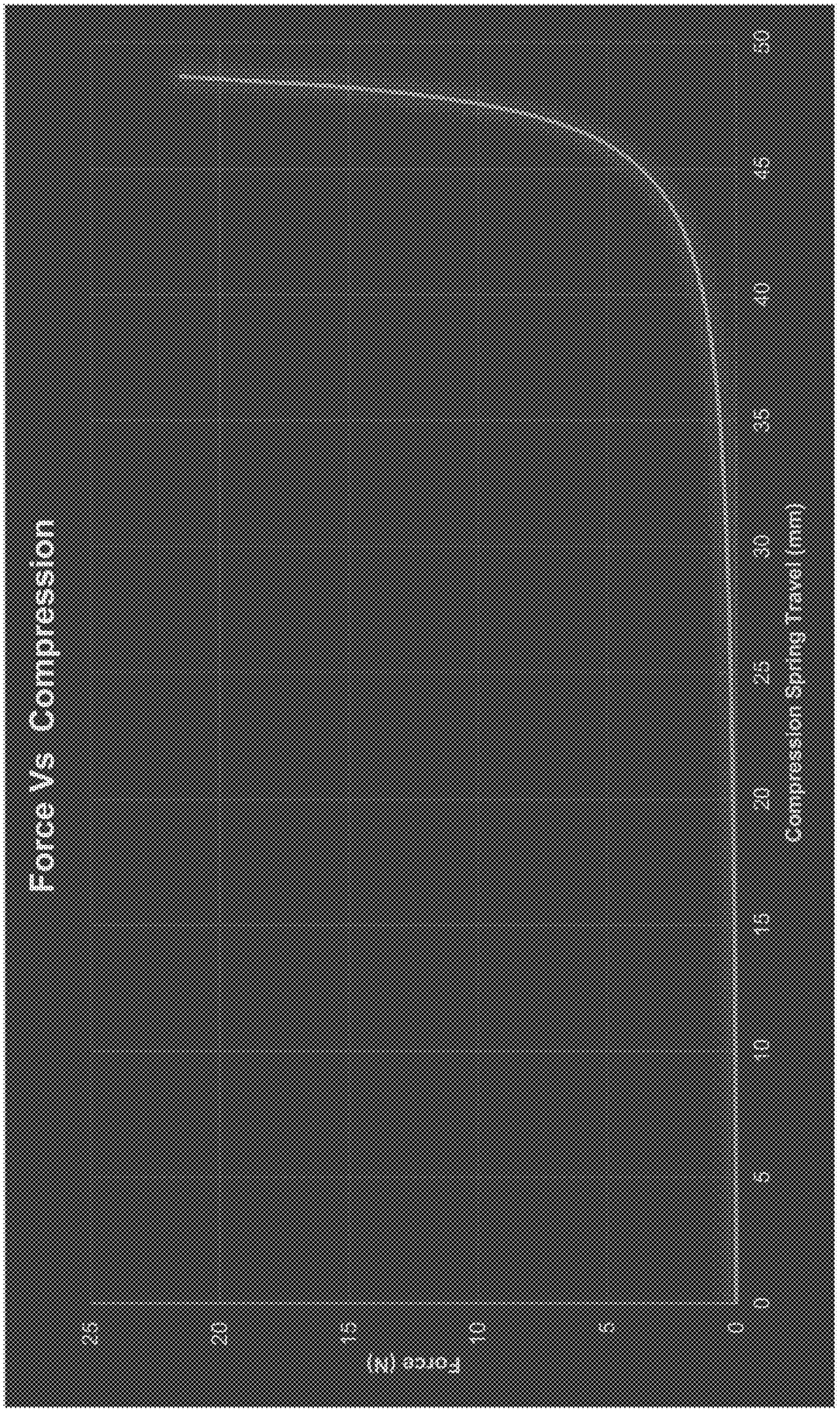
FIGS. 27-29 are diagrams showing an exponential relationship between the torsion spring force and axial travel of the sled along the shell when the ramps of the shell have an increasing ramp angle.
Figure 28:
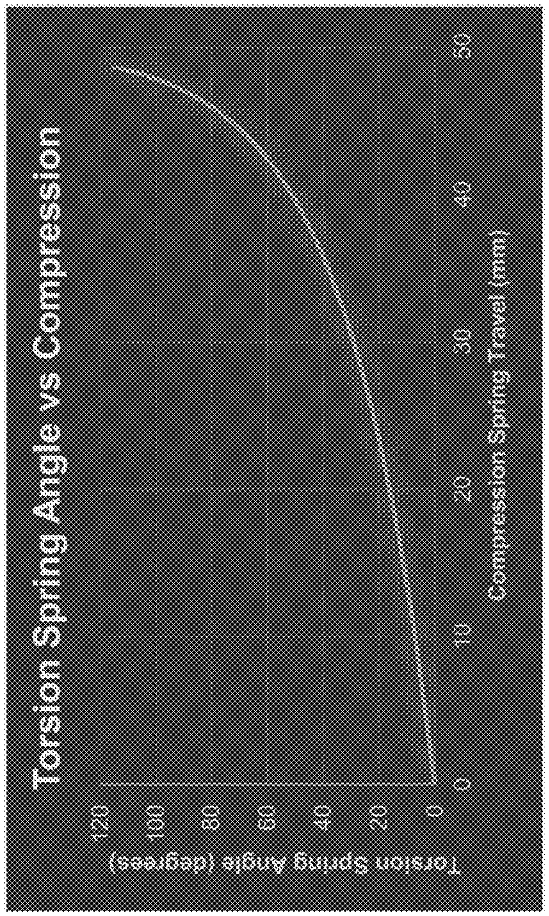
Figure 29:
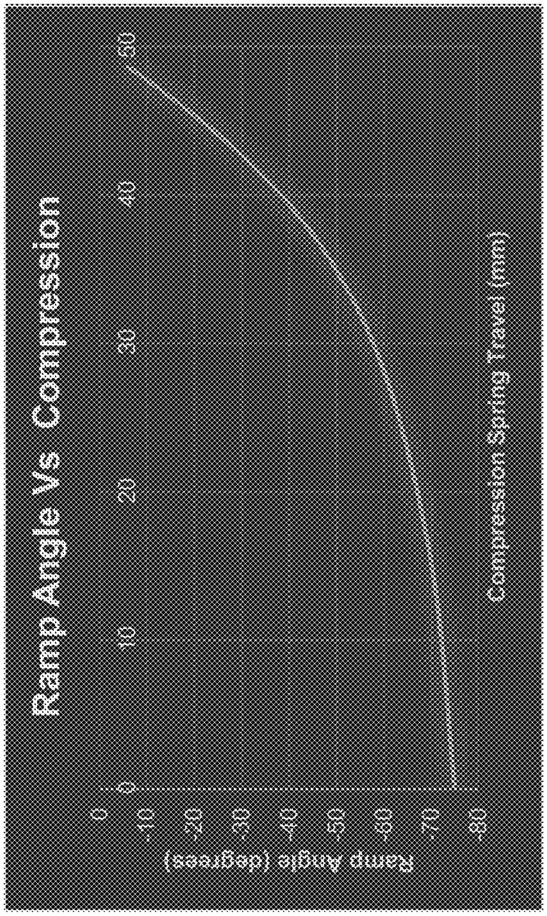
Figure 30:
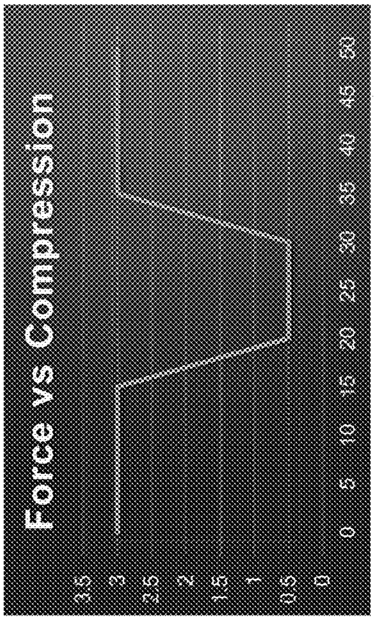
FIGS. 30-33 are diagrams showing example relationships between the torsion spring force and axial travel of the sled along the shell based on different ramp angles.
Figure 31:
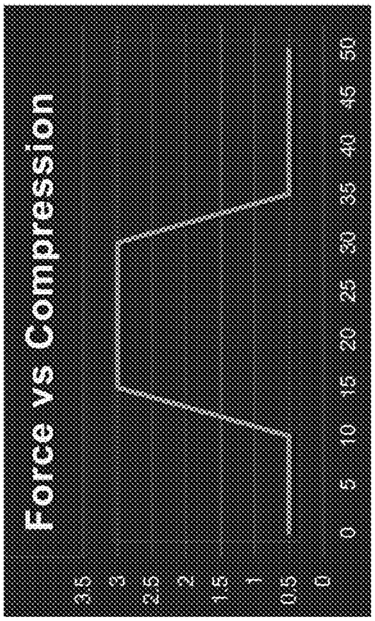
Figure 32:
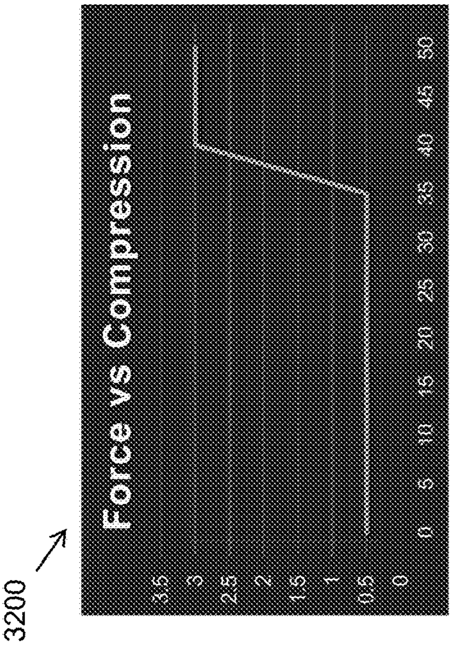
Figure 33:
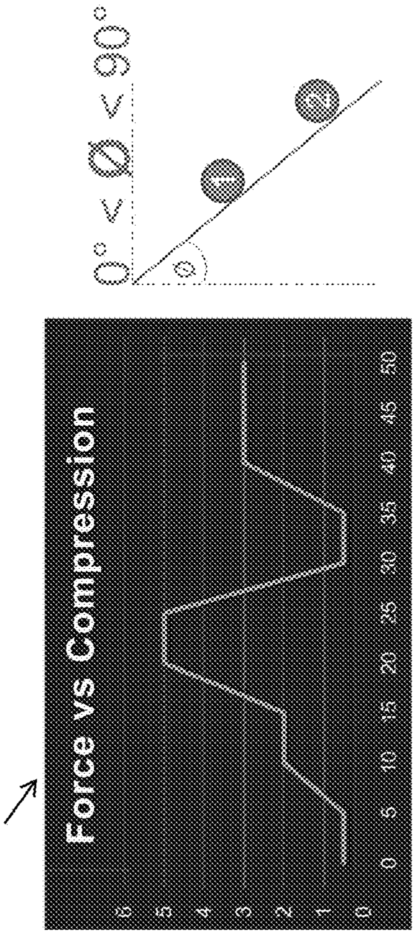

As shown in FIG. 27-29, the compression mechanism may be configured to provide an exponentially increasing force profile when the ramp angle increases from the first end 22*a* toward the second end 22*b* of the shell 22. That is, the force required to move the sled 24 axially toward the recessed position increases exponentially as the sled 24 moves toward the second end 22*b*. Thus, with the sled 24 at the second end 22*b* and with the torsion spring 28 biasing the sled 24 toward the first end 22*a*, the axial force provided by the compression mechanism 20 is greater as the sled 24 first moves from the second end 22*b* toward the first end 22*a* and the axial force may decrease exponentially as the sled 24 moves axially along the shell 22. The diagram 2700 in FIG. 27 depicts the exponentially increasing force profile along the range of motion. The diagram 2800 in FIG. 28 shows that, as the sled 24 moves from the first end 22*a* toward the second end 22*b*, the winding angle of the torsion spring 28 exponentially increases, as controlled by the increasing ramp angle shown by the diagram 2900 in FIG. 29, to provide the increasing force profile.

The respective diagrams 3000, 3100, 3200, and 3300 of FIGS. 30-33 show that any force profile may be possible if the ramp angle is maintained between 0 degrees and 90 degrees relative to the longitudinal axis of the shell 22. Thus, the non-linear compression mechanism may be suitable for use in any application that may typically use a compression spring. For example, a manual fold mirror assembly with the non-linear compression mechanism may provide a sharper detent break point, where the mirror head may be more reliably separated or moved from a detent position. A power fold mirror assembly with the non-linear compression mechanism may decrease the axial force on the mirror actuator while the mirror head is being electrically driven. The non-linear compression mechanism may be utilized with a linear flush door handle assembly. The non-linear compression mechanism may be utilized for impact loading mitigation, such as to provide slower deceleration and longer force dissipation time. The non-linear compression mechanism may provide a self-centering linear spring, such as a damper, and may be compliant for impact. The non-linear compression mechanism may have a common or universal sled, with different shells configured to different applications to offer different options while using a common or universal spring.

That is, although described herein as coupled to an exterior rearview mirror assembly, it should be understood that aspects of the compression mechanism may be suitable for use with one or more other vehicular components, such as the exterior rearview mirror, a charge port or fuel port cover, a headlamp or tail lamp or corresponding cover, a vehicle door, a vehicle hood or trunk, and/or a vehicular door handle.

Figure 34:
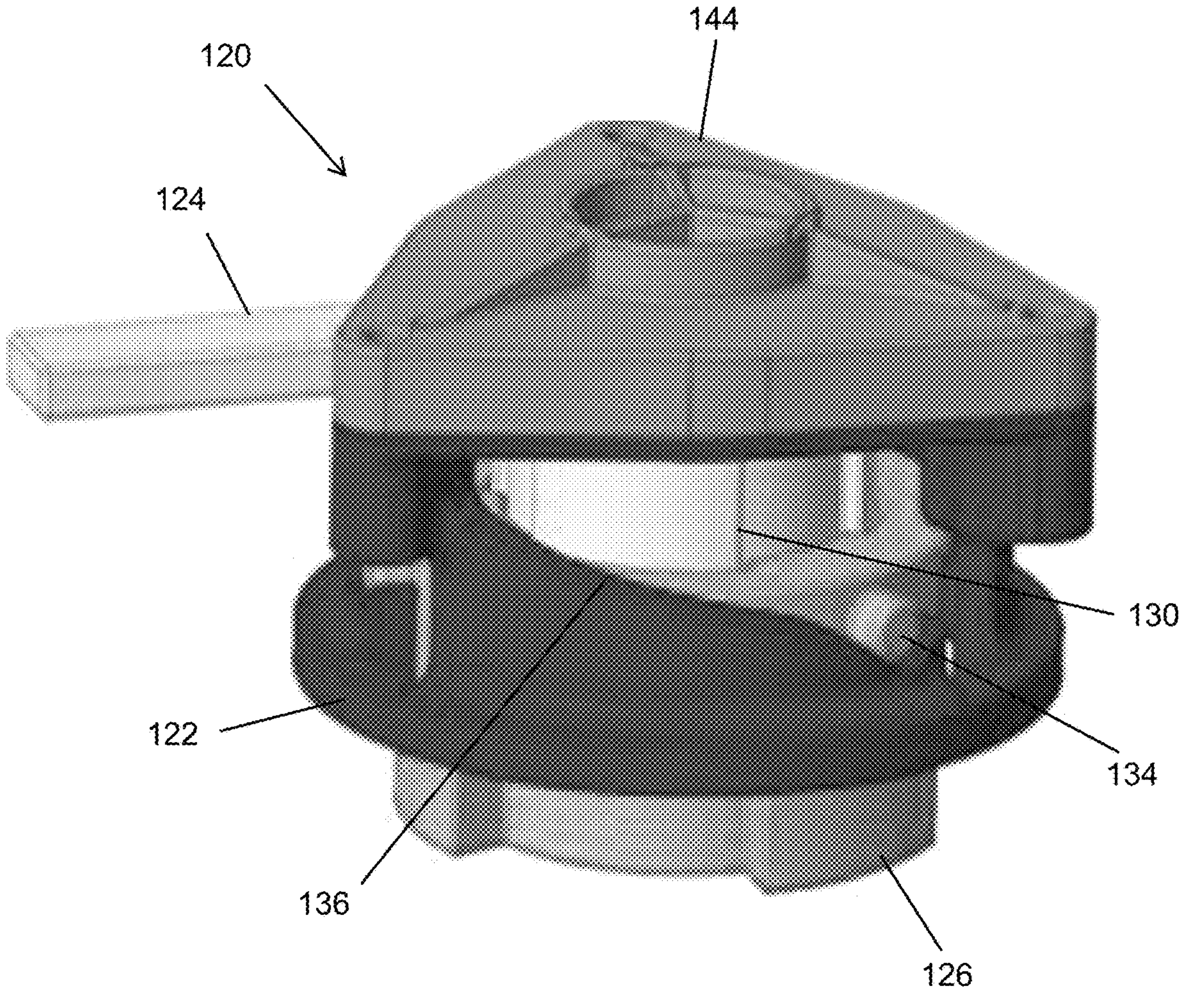
FIG. 34 is a perspective view of a variable torque mechanism of an actuator assembly operable to pivot a handle portion of the door handle assembly between recessed and extended positions.
Figure 35:
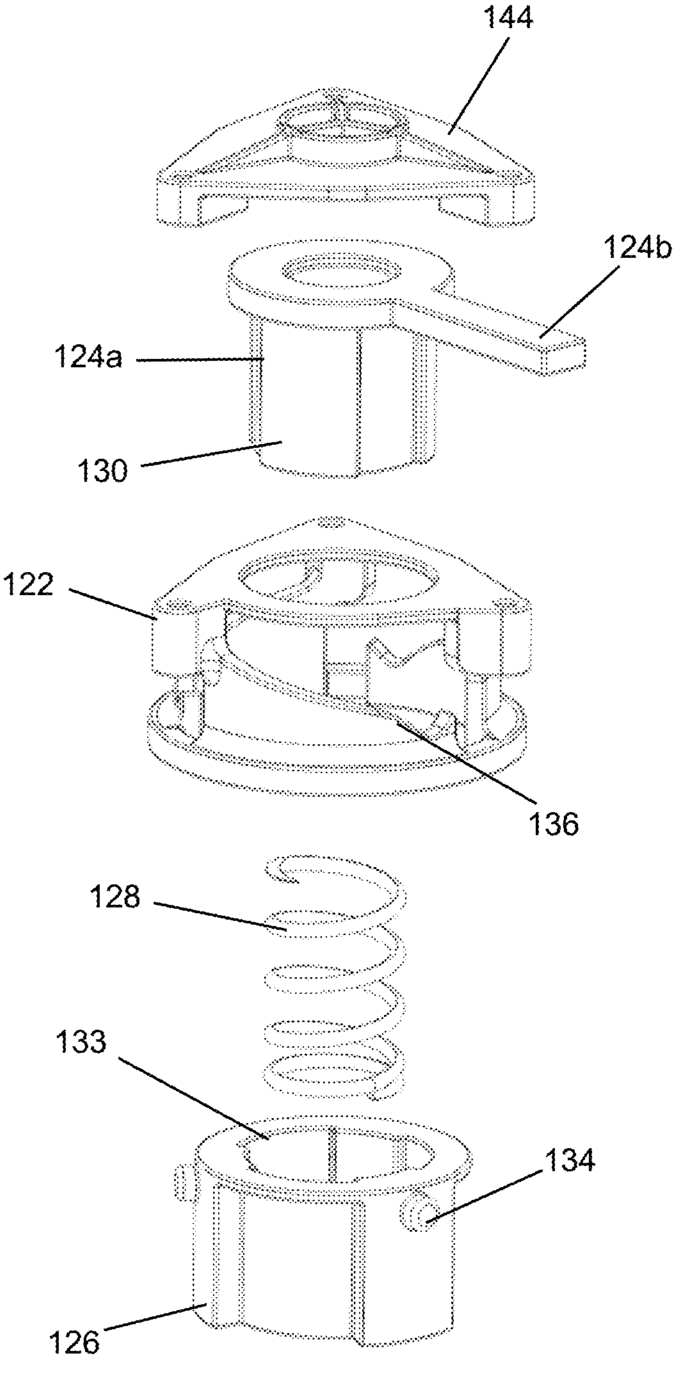
FIG. 35 is an exploded view of the variable torque mechanism.

For example, and referring to FIG. 1, the door handle assembly or module or unit 40 is mountable to the door 11*a* of the vehicle 11 and operable to release a latch mechanism of the door 11*a* to open the vehicle door. The vehicle door handle assembly 40 includes a base portion or bracket that is mountable to the vehicle door 11*a* and a handle or strap portion 42 that is movably or pivotally mounted to the bracket. When not in use, the handle portion 42 may be at an initial rest or recessed or non-use position where the handle portion 42 is at least partially received in the base portion so that an outer surface of the handle portion 42 is generally flush with or generally coplanar with (or protruding only slightly from or recessed slightly in) the outer surface of the base portion or the door panel, whereby the handle portion 42 is not readily usable by a user. The handle portion 42 is electromechanically pivotable or movable or laterally movable relative to the door 11*a* and the base portion to move to its ready or operational or grippable or graspable or person-operable position and is then graspable or grippable by a user where the handle portion 42 may be manually moved (such as via pulling by the user) to actuate or release the latch mechanism of the door to open the vehicle door. As described further below, an actuator assembly may be operable to impart the pivotal movement of the handle portion 42 relative to the base portion and the actuator assembly may include a variable torque compression spring mechanism 120 that provides a variable torque profile through a rotational or pivotal range of motion (FIG. 34).

The handle assembly 40 may comprise any suitable type of handle assembly, and the handle assembly and actuator may include or incorporate aspects of the door handle assemblies and actuators described in U.S. Pat. Nos. 8,786,401; 6,977,619; 7,407,203; 6,349,450; 6,550,103; 6,907,643; 8,801,245 and/or 8,333,492, and/or U.S. Publication Nos. US-2022-0018168; US-2022-0282534; US-2022-0341226; US-2010-0088855; US-2010-0007463 and/or US-2020/0102773, and/or U.S. patent application Ser. No. 18/359,114, filed Jul. 26, 2023, which are all hereby incorporated herein by reference in their entireties. Although shown as a strap type handle, the handle assembly may comprise any suitable type of vehicle door handle assembly, such as a paddle type vehicle door handle assembly (having a paddle or the like that may be pulled at to open the vehicle door) or other type of vehicle door handle assembly. Furthermore, aspects of the handle assembly 40 may be suitable for use with a liftgate handle assembly for a liftgate or tailgate of a vehicle.

Referring to FIGS. 34-40C, the variable torque mechanism 120 may be utilized where a torsion spring would typically provide a variable torque profile through a range of motion, and the variable torque mechanism uses a compression spring 128 instead of the torsion spring. For example, the variable torque mechanism 120 may be coupled to the handle portion 42 or actuator to impart pivotal motion of the handle portion 42 and/or assist the actuator in moving the handle portion 42 from the recessed position toward the extended position. When the handle portion 42 is at the recessed position and the actuator is operated to move the handle portion toward the extended position, the variable torque mechanism 120 may be configured to provide a greater torque profile at the beginning of the range of motion of the handle portion 42 from the recessed position, such as to overcome ice buildup or other obstructions limiting movement of the handle portion 42 from the recessed position. Optionally, the variable torque mechanism 120 may provide the greater torque profile toward the end of the range of motion of the handle portion 42, such as to cinch the handle portion or actuator as the handle portion moves from the extended position toward the recessed position. Thus, the variable torque mechanism 120 may provide a better solution for flush features of a vehicle, such as a flush door handle, flush camera wing, flush power charge flaps, and the like.

The variable torque mechanism includes an outer ring or shell or housing 122 that is fixed, such as to the base portion of the handle assembly 40. A slider or carrier 126 is movably disposed along a channel of the outer ring 122, where the channel extends along a longitudinal axis of the outer ring 122. The carrier 126 includes one or more protrusions 134 that extend radially from an outer surface of the carrier 126 and that are received along respective ramps 136 formed along the channel of the outer ring 122. The carrier 126 is configured to rotate and lift (i.e., move axially) relative to the outer ring 122 according to movement of the protrusions 134 along the ramps 136.

A torque arm or connecting component 124 is coupled to the carrier 126 and coupled to the movable vehicular component (e.g., the handle portion). The torque arm 124 is fixed along the longitudinal axis of the outer ring 122, and includes a body portion 124*a* that is keyed to the carrier 126 to rotate the torque arm 124 about the longitudinal axis according to rotation of the carrier 126. For example, the body portion 124*a* of the torque arm 124 includes one or more detents 130 along an outer circumferential surface of the body portion 124*a* that are keyed to respective detents 133 at an inner surface of the carrier 126 so that the carrier 126 and torque arm 124 are rotationally fixed relative to one another and the carrier 126 may move axially along the longitudinal axis of the outer ring 122 relative to the axially fixed torque arm 124. An arm 124*b* extends from the body portion 124*a* of the torque arm 124 and is coupled to the movable vehicular component (e.g., the handle portion) to impart movement of the vehicular component when the torque arm 124 pivots relative to the outer ring 122.

Figure 37:
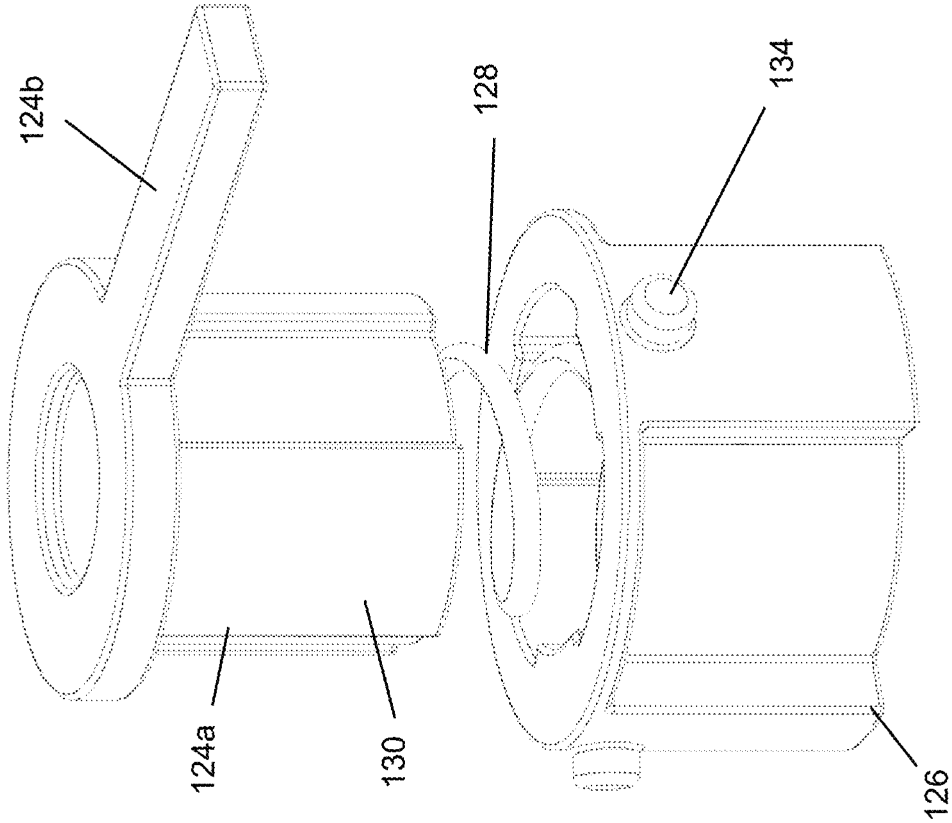
FIGS. 36 and 37 are exploded views of the torque arm, carrier, and compression spring of the variable torque mechanism.
Figure 36:
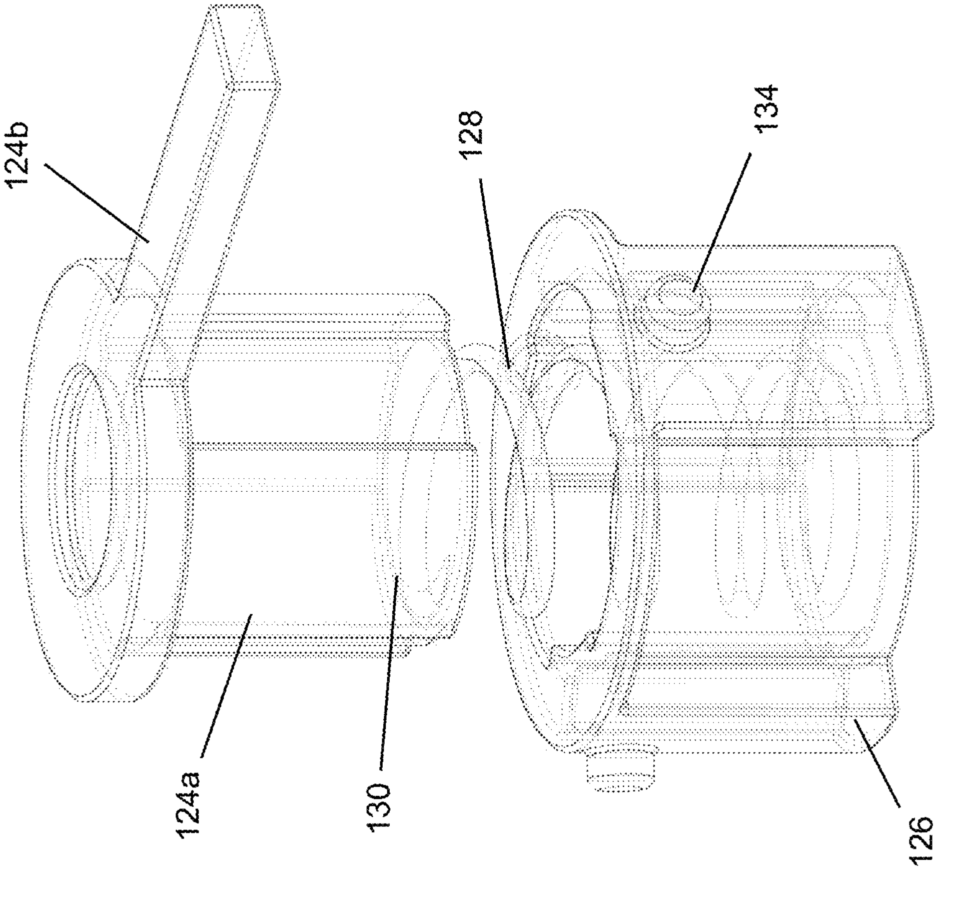
Figure 38:
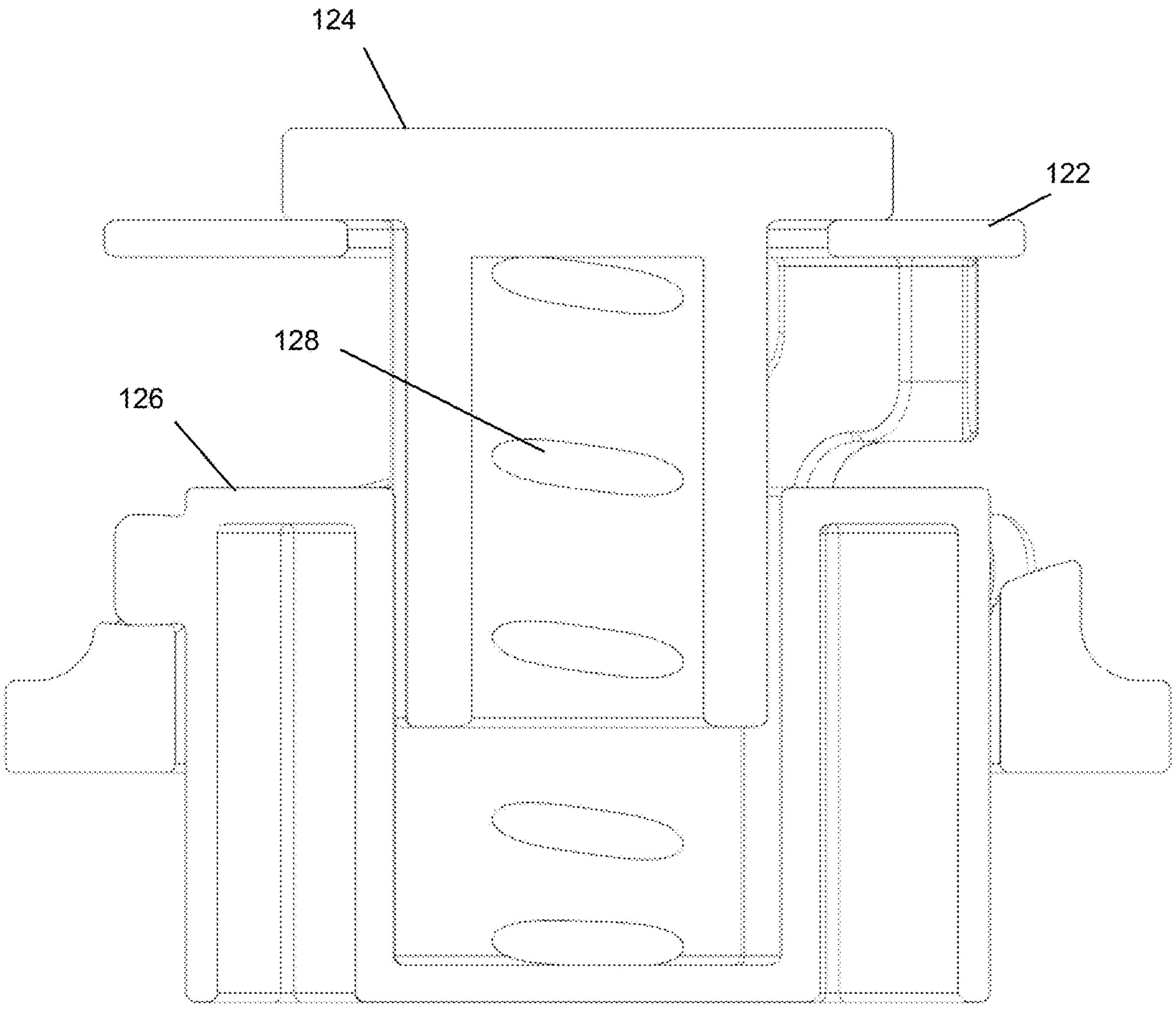
FIGS. 38 and 39 are sectional views of the variable torque mechanism.
Figure 39:
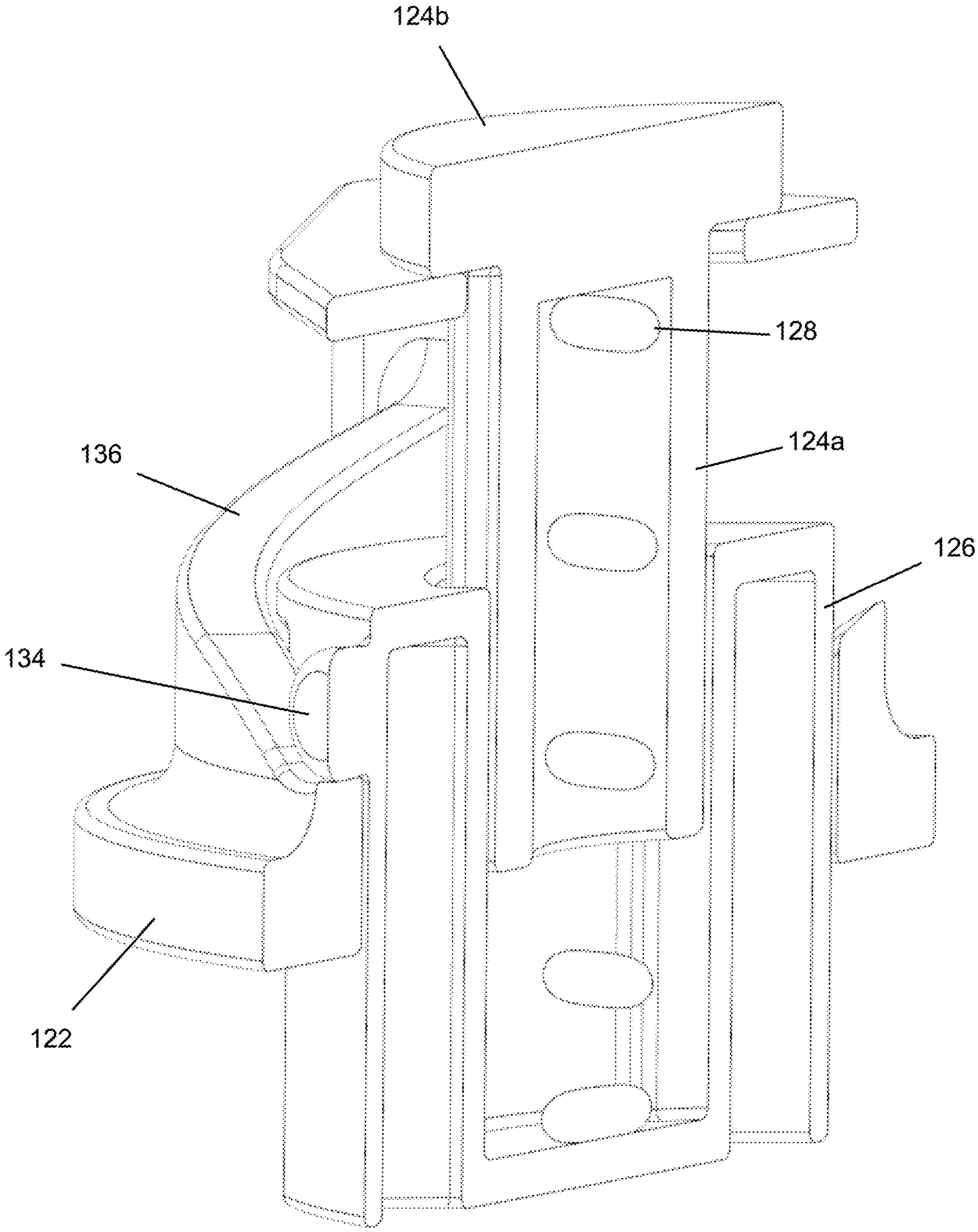
Figure 40C:
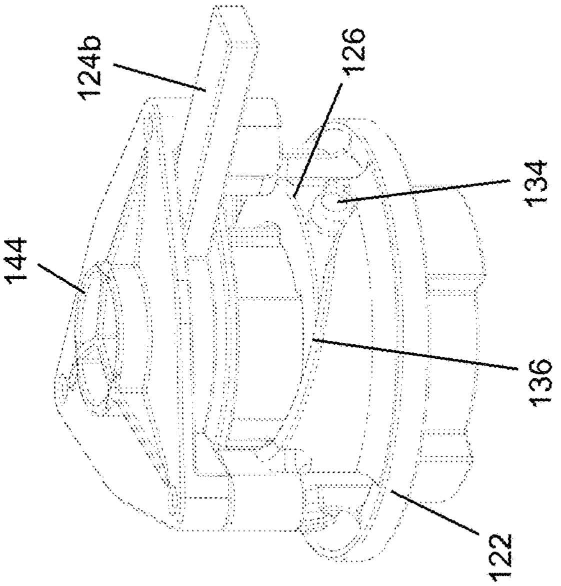
FIGS. 40A-40C are perspective views of the variable torque mechanism as the torque arm pivots relative to the outer ring of the variable torque mechanism.
Figure 40B:
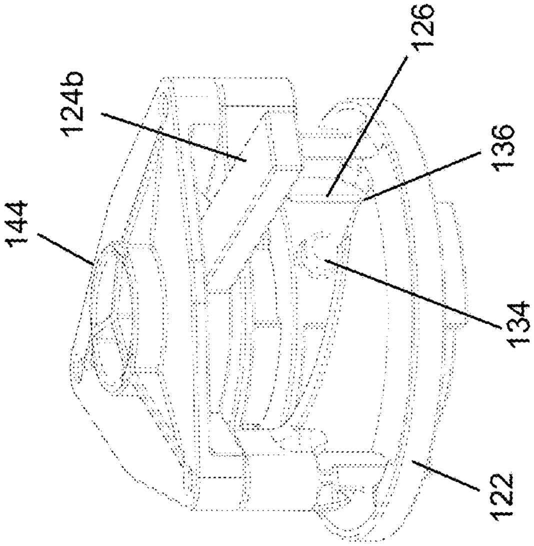
Figure 40A:
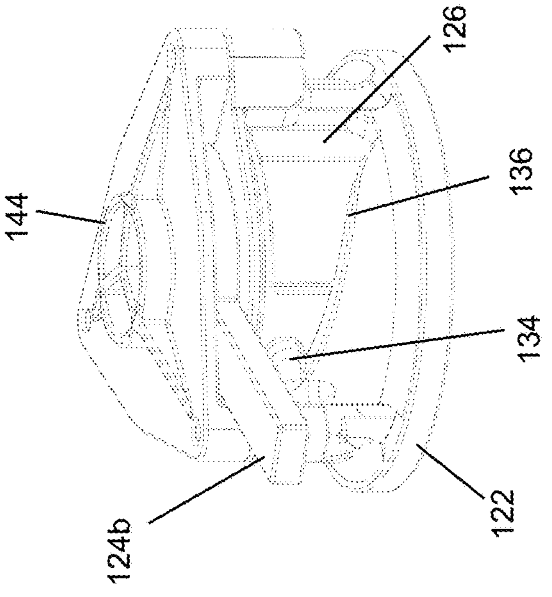

As shown in FIGS. 36 and 37, a compression spring 128 (or other suitable biasing element) is disposed between the torque arm 124 and the carrier 126 to bias the torque arm 124 and carrier 126 away from one another along the longitudinal axis of the outer ring 122. In other words, the compression spring 128 is locked between the torque arm 124 and the carrier 126, pushing them apart. The torque arm 124 is fixed along the longitudinal axis of the outer ring 122, such as by the arm 124*b* disposed between an upper portion of the outer ring 122 and a cap 144 or a portion of the movable vehicular component, and the compression spring 128 biases the carrier 126 into engagement with the outer ring 122 so that the protrusions 134 of the carrier 126 engage the ramps 136 of the outer ring 122. Thus, the compression spring 128 biases the protrusions 134 along the ramps 136 and, because the torque arm 124 and carrier are keyed together, the torque arm 124 is rotationally or pivotally biased according to movement of the protrusions 134 along the ramps 136. The compression spring 128 may be received along an inner portion or channel of the body portion 124*a* of the torque arm 124 and an inner portion or channel of the carrier 126 (FIGS. 38 and 39).

As the torque arm 124 rotates relative to the outer ring 122, such as to extend the handle portion 42 of the handle assembly 40, the carrier 126 rotates with the torque arm 124 and moves axially relative to the torque arm 124 and outer ring 122 according to movement of the protrusions 134 along the ramps 136. When the torque arm 124 is at a first rotational position, such that the carrier 126 is closer to the cap 144 and torque arm 124 and the protrusions are at the upper end or portion of the ramps 136 (FIG. 40A), the compression spring 128 is compressed between the torque arm 124 and the carrier 126 and biases the carrier 126 away from the torque arm 124, thus biasing the torque arm 124 in the pivotable direction according to travel of the protrusions 134 along the ramps 136. As the torque arm pivots toward a second rotational position, where the carrier 126 is further form the cap 144 and torque arm 124 and the protrusions 136 are at the lower end or portion of the ramps 136 (FIG. 40C), the compression spring 128 is decompressed and thus provides a lesser biasing force against the carrier 126 and torque arm 124 than in the first position. In other words, the torque provided by the torque arm 124 when the protrusions 134 are at the upper end portion of the ramps 136 and the compression spring 128 is compressed is greater than when the protrusions 134 are at the lower end portion of the ramps 136 and the compression spring 128 is decompressed.

For example, the variable torque mechanism may be configured relative to the door handle assembly such that the protrusions 134 are at the upper end portion of the ramps 136 (and thus biasing force is greatest) when the handle portion is in the recessed position. Thus, when the handle portion is moved from the recessed position toward the extended position, the compression spring 128 urges the carrier 126 along the channel of the outer ring 122 and the carrier 126 and torque arm 124 rotate relative to the outer ring 122 according to movement of the protrusions 134 along the ramps 136 to urge the handle portion from the recessed position. As the compression spring 128 decompresses and the carrier 126 moves along the channel of the outer ring 122, the biasing force provided through the torque arm 124 to the handle portion decreases. Applying greater torque during initial movement from the recessed position provides an ice break function for the door handle assembly.

In other words, the output torque from the mechanism 120 is derived from the spring force, and the angle at which the carrier 126 contacts the ramps 136 of the outer ring 122, as well as the inner radius of the outer ring 122. The torque can be increased by increasing the spring rate, increasing the diameter of the outer ring, or increasing the ramp angle. The compression spring 128 does not rotate relative to the carrier 126 or torque arm 124, so there is no slip interface and the spring only ever changes in compression.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:

a mirror head accommodating a mirror reflective element;

a mounting base configured for mounting the vehicular exterior rearview mirror assembly at a side of a vehicle equipped with the vehicular exterior rearview mirror assembly;

wherein, with the vehicular exterior rearview mirror assembly mounted at the side of the vehicle, the mirror head is movable relative to the mounting base between at least (i) an extended position, where the mirror head is extended outward from the side of the vehicle so that the mirror reflective element is positioned to provide a rearward view at the side of the vehicle to a driver of the vehicle, and (ii) a folded position, where the mirror head is moved inward from the extended position toward the side of the vehicle;

an electrically operable actuator, wherein, with the vehicular exterior rearview mirror assembly mounted at the side of the vehicle, the actuator is electrically operable to move the mirror head relative to the mounting base between the folded position and the extended position;

wherein the actuator comprises a base portion that attaches at the mounting base and a pivot tube that extends from the base portion of the actuator;

wherein the pivot tube extends through a housing of the actuator;

wherein the mirror head is attached at the housing of the actuator and wherein the mirror head and the housing of the actuator, when the actuator is electrically operated, move together and in tandem about a longitudinal axis of the pivot tube of the actuator;

wherein the actuator comprises a biasing mechanism that, when the mirror head moves between the extended position and the folded position, biases the mirror head relative to the mounting base in a direction parallel to the longitudinal axis of the pivot tube;

wherein the biasing mechanism comprises (i) a shell portion that is fixed relative to the mounting base and that extends in the direction parallel to the longitudinal axis of the pivot tube, (ii) a longitudinally movable portion that is coupled to the mirror head and (iii) a torsion spring;

wherein the longitudinally movable portion, when the mirror head moves between the extended position and the folded position, moves relative to the shell portion in the direction parallel to the longitudinal axis of the pivot tube;

wherein the torsion spring biases the longitudinally movable portion of the biasing mechanism in the direction parallel to the longitudinal axis of the pivot tube; and wherein, when the actuator moves the mirror head from the extended position toward the folded position, the biasing of the mirror head toward the mounting base decreases.

2. The vehicular exterior rearview mirror assembly of claim 1, wherein the torsion spring applies a torque about the longitudinal axis of the pivot tube to bias the longitudinally movable portion of the biasing mechanism in the direction parallel to the longitudinal axis of the pivot tube.

3. The vehicular exterior rearview mirror assembly of claim 2, wherein the biasing mechanism comprises a pivotable portion, and wherein the pivotable portion and the longitudinally movable portion move in the direction parallel to the longitudinal axis of the pivot tube together and in tandem with one another, and wherein the pivotable portion, when the pivotable portion and the longitudinally movable portion move in the direction parallel to the longitudinal axis of the pivot tube, pivots about the longitudinal axis of the pivot tube relative to the longitudinally movable portion and the shell portion, and wherein the torsion spring applies the torque to the pivotable portion to bias the pivotable portion and the longitudinally movable portion in the direction parallel to the longitudinal axis of the pivot tube.

4. The vehicular exterior rearview mirror assembly of claim 3, wherein the torsion spring comprises a first end that is pivotally fixed relative to the longitudinally movable portion of the biasing mechanism, and a second end that is fixed relative to the pivotable portion of the biasing mechanism, and wherein when the pivotable portion of the biasing mechanism pivots about the longitudinal axis of the pivot tube, the second end of the torsion spring pivots about the longitudinal axis of the pivot tube relative to the first end of the torsion spring to wind and unwind the torsion spring.

5. The vehicular exterior rearview mirror assembly of claim 4, wherein the longitudinally movable portion of the biasing mechanism is pivotally fixed about the longitudinal axis of the pivot tube relative to the shell portion of the biasing mechanism.

6. The vehicular exterior rearview mirror assembly of claim 5, wherein the pivotable portion of the biasing mechanism comprises a pin that is received at a ramp of the shell portion of the biasing mechanism, and wherein, when the pivotable portion and the longitudinally movable portion move relative to the shell portion in the direction parallel to the longitudinal axis of the pivot tube, movement of the pin along the ramp guides pivotal movement of the pivotable portion about the longitudinal axis of the pivot tube relative to the longitudinally movable portion and the shell portion.

7. The vehicular exterior rearview mirror assembly of claim 1, wherein the biasing mechanism, when the mirror head moves between the extended position and the folded position, biases the mirror head in the direction parallel to the longitudinal axis of the pivot tube according to a non-constant force profile.

8. The vehicular exterior rearview mirror assembly of claim 1, wherein the biasing mechanism, when the mirror head moves between the extended position and the folded position, biases the mirror head in the direction parallel to the longitudinal axis of the pivot tube according to a constant force profile.

9. The vehicular exterior rearview mirror assembly of claim 1, wherein the biasing mechanism, when the mirror head moves between the extended position and the folded position, biases the mirror head in the direction parallel to the longitudinal axis of the pivot tube according to a linear force profile.

10. The vehicular exterior rearview mirror assembly of claim 1, wherein the biasing mechanism, when the mirror head moves between the extended position and the folded position, biases the mirror head in the direction parallel to the longitudinal axis of the pivot tube according to a non-linear force profile.

11. The vehicular exterior rearview mirror assembly of claim 1, wherein, with the mirror head in the extended position, the biasing mechanism biases the mirror head in the direction parallel to the longitudinal axis of the pivot tube away from the mounting base.

12. The vehicular exterior rearview mirror assembly of claim 1, wherein, when the actuator moves the mirror head from the folded position toward the extended position, the biasing of the mirror head toward the mounting base decreases.

13. The vehicular exterior rearview mirror assembly of claim 1, wherein, when the actuator moves the mirror head from the folded position toward the extended position, the biasing of the mirror head toward the mounting base increases.

14. A vehicular exterior rearview mirror assembly, the vehicular exterior rearview mirror assembly comprising:

a mirror head accommodating a mirror reflective element;

a mounting base configured for mounting the vehicular exterior rearview mirror assembly at a side of a vehicle equipped with the vehicular exterior rearview mirror assembly;

wherein, with the vehicular exterior rearview mirror assembly mounted at the side of the vehicle, the mirror head is movable relative to the mounting base between at least (i) an extended position, where the mirror head is extended outward from the side of the vehicle so that the mirror reflective element is positioned to provide a rearward view at the side of the vehicle to a driver of the vehicle, and (ii) a folded position, where the mirror head is moved inward from the extended position toward the side of the vehicle;

an electrically operable actuator, wherein, with the vehicular exterior rearview mirror assembly mounted at the side of the vehicle, the actuator is electrically operable to move the mirror head relative to the mounting base between the folded position and the extended position;

wherein the actuator comprises a base portion that attaches at the mounting base and a pivot tube that extends from the base portion of the actuator;

wherein the pivot tube extends through a housing of the actuator;

wherein the mirror head is attached at the housing of the actuator and wherein the mirror head and the housing of the actuator, when the actuator is electrically operated, move together and in tandem about a longitudinal axis of the pivot tube of the actuator;

wherein the actuator comprises a biasing mechanism that, when the mirror head moves between the extended position and the folded position, biases the mirror head relative to the mounting base in a direction parallel to the longitudinal axis of the pivot tube;

wherein the biasing mechanism comprises (i) a shell portion that is fixed relative to the mounting base and that extends in the direction parallel to the longitudinal axis of the pivot tube, (ii) a longitudinally movable portion that is coupled to the mirror head and (iii) a torsion spring;

wherein the longitudinally movable portion, when the mirror head moves between the extended position and the folded position, moves relative to the shell portion in the direction parallel to the longitudinal axis of the pivot tube;

wherein the torsion spring applies a torque about the longitudinal axis of the pivot tube to bias the longitudinally movable portion of the biasing mechanism in the direction parallel to the longitudinal axis of the pivot tube;

wherein the biasing mechanism, when the mirror head moves between the extended position and the folded position, biases the mirror head in the direction parallel to the longitudinal axis of the pivot tube according to a non-constant force profile; and wherein, when the actuator moves the mirror head from the extended position toward the folded position, the biasing of the mirror head toward the mounting base decreases, and wherein, when the actuator moves the mirror head from the folded position toward the extended position, the biasing of the mirror head toward the mounting base decreases.

15. The vehicular exterior rearview mirror assembly of claim 14, wherein the biasing mechanism comprises a pivotable portion, and wherein the pivotable portion and the longitudinally movable portion move in the direction parallel to the longitudinal axis of the pivot tube together and in tandem with one another, and wherein the pivotable portion, when the pivotable portion and the longitudinally movable portion move in the direction parallel to the longitudinal axis of the pivot tube, pivots about the longitudinal axis of the pivot tube relative to the longitudinally movable portion and the shell portion, and wherein the torsion spring applies the torque to the pivotable portion to bias the pivotable portion and the longitudinally movable portion in the direction parallel to the longitudinal axis of the pivot tube.

16. The vehicular exterior rearview mirror assembly of claim 15, wherein the torsion spring comprises a first end that is pivotally fixed relative to the longitudinally movable portion of the biasing mechanism, and a second end that is fixed relative to the pivotable portion of the biasing mechanism, and wherein when the pivotable portion of the biasing mechanism pivots about the longitudinal axis of the pivot tube, the second end of the torsion spring pivots about the longitudinal axis of the pivot tube relative to the first end of the torsion spring to wind and unwind the torsion spring.

17. The vehicular exterior rearview mirror assembly of claim 16, wherein the longitudinally movable portion of the biasing mechanism is pivotally fixed about the longitudinal axis of the pivot tube relative to the shell portion of the biasing mechanism.

18. The vehicular exterior rearview mirror assembly of claim 17, wherein the pivotable portion of the biasing mechanism comprises a pin that is received at a ramp of the shell portion of the biasing mechanism, and wherein, when the pivotable portion and the longitudinally movable portion move relative to the shell portion in the direction parallel to the longitudinal axis of the pivot tube, movement of the pin along the ramp guides pivotal movement of the pivotable portion about the longitudinal axis of the pivot tube relative to the longitudinally movable portion and the shell portion.

19. The vehicular exterior rearview mirror assembly of claim 14, wherein, with the mirror head in the extended position, the biasing mechanism biases the mirror head in the direction parallel to the longitudinal axis of the pivot tube away from the mounting base.

* * * * *